United States Patent [19]

Burroughs

[11] Patent Number: 5,467,062
[45] Date of Patent: Nov. 14, 1995

[54] MINIATURE COAX JACK MODULE

[75] Inventor: Dennis M. Burroughs, Savage, Minn.

[73] Assignee: ADC Telecommunications, Inc., Minneapolis, Minn.

[21] Appl. No.: 252,067

[22] Filed: Jun. 1, 1994

Related U.S. Application Data

[63] Continuation of Ser. No. 859,272, Apr. 2, 1992, abandoned.

[51] Int. Cl.$^6$ .................................................. H01P 1/10
[52] U.S. Cl. ........................ 333/124; 439/34; 439/516; 200/51.1
[58] Field of Search ...................... 333/101, 105, 333/124; 439/43, 49, 189, 516, 518, 188, 668; 200/51.1, 51.13; 361/352, 601, 733, 731

[56] References Cited

U.S. PATENT DOCUMENTS

| | | | |
|---|---|---|---|
| 3,109,997 | 11/1963 | Giger et al. | 333/124 |
| 3,360,747 | 12/1967 | Lancaster | 333/105 |
| 3,529,264 | 9/1970 | Lancaster | 333/124 X |
| 4,749,968 | 6/1988 | Burroughs | 333/105 |
| 4,770,639 | 9/1988 | Lau | 439/61 |
| 4,815,104 | 3/1989 | Williams et al. | 333/105 X |
| 4,840,568 | 6/1989 | Burroughs et al. | 439/49 |
| 5,246,378 | 9/1993 | Seiceanu | 439/188 |

FOREIGN PATENT DOCUMENTS 0380210  8/1990  European Pat. Off. .
80212446  5/1992  Taiwan .

OTHER PUBLICATIONS

P. 7 of 1988 publication of Trimm, Inc. entitled "Digital Cross-Connect (DSX) Catalog No. 5".
English Translation of Taiwanese Patent No. 80121446.

*Primary Examiner*—Benny Lee
*Attorney, Agent, or Firm*—Merchant, Gould, Smith, Edell, Welter & Schmidt

[57] ABSTRACT

A miniature coax jack module includes a grounded conductive housing with coax conductors disposed of within the housing. A dielectric insert maintains the conductors in electrically spaced relation to the housing. The housing has internal surfaces surrounding the conductors to provide coax shielding to the conductors.

38 Claims, 41 Drawing Sheets

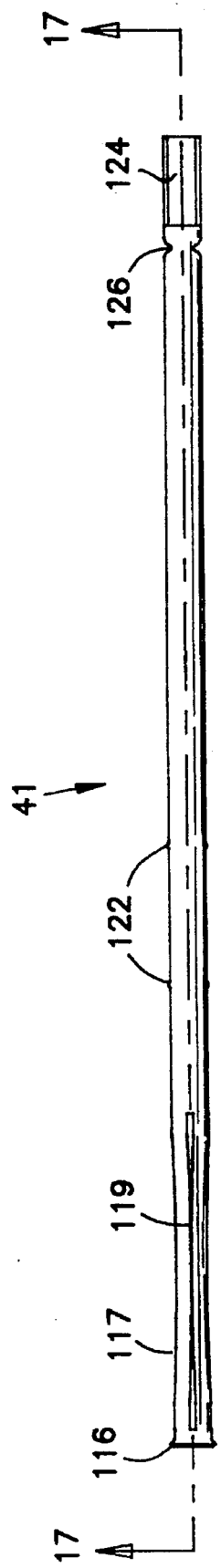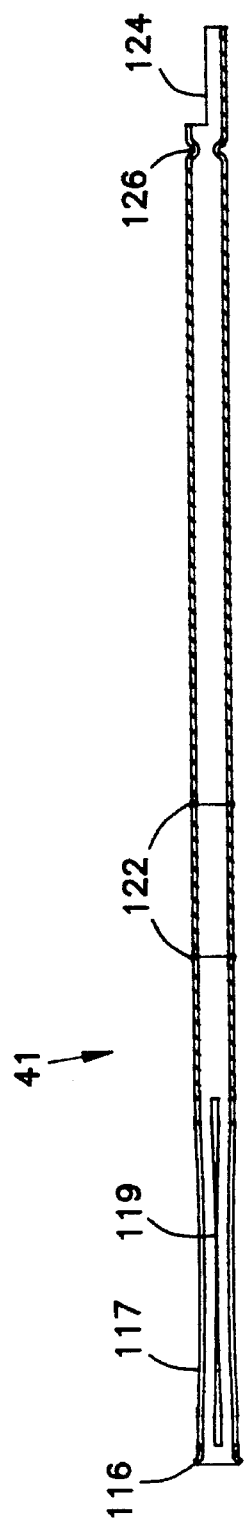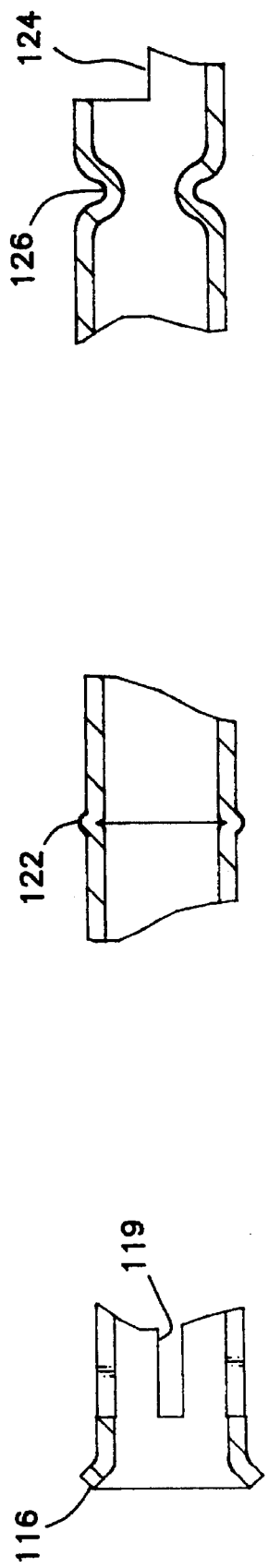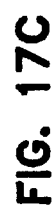

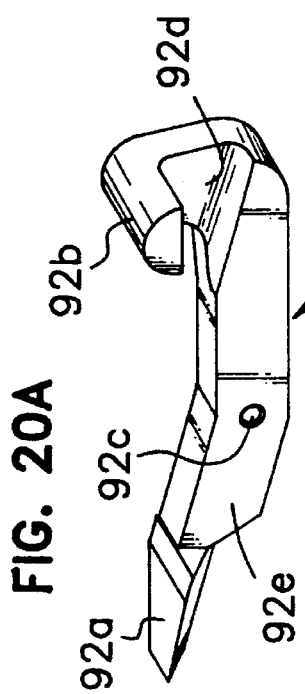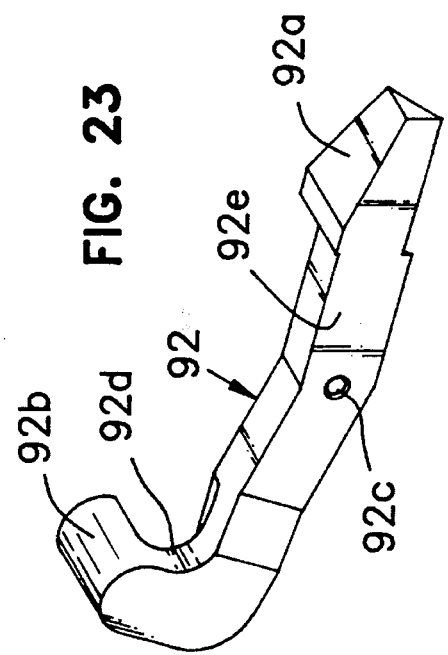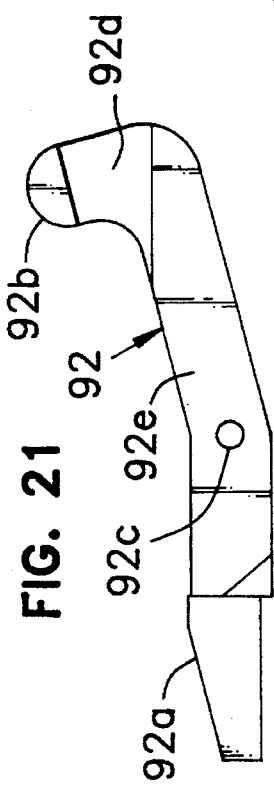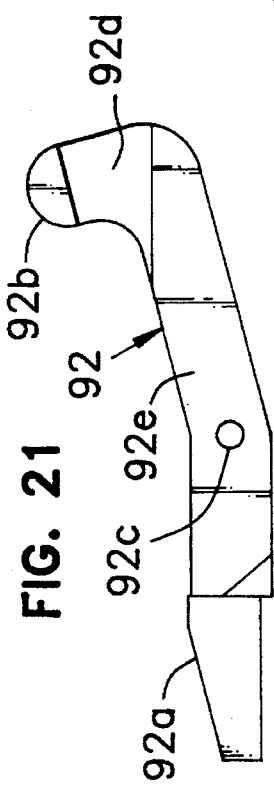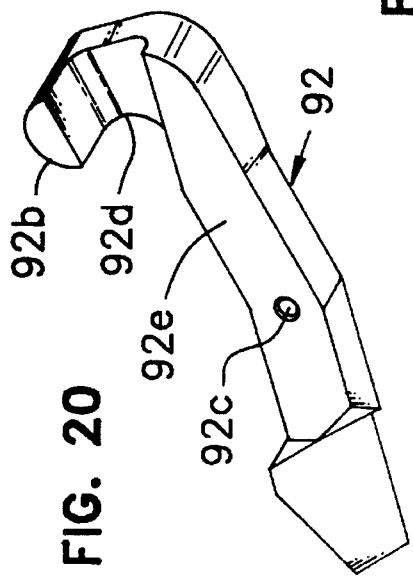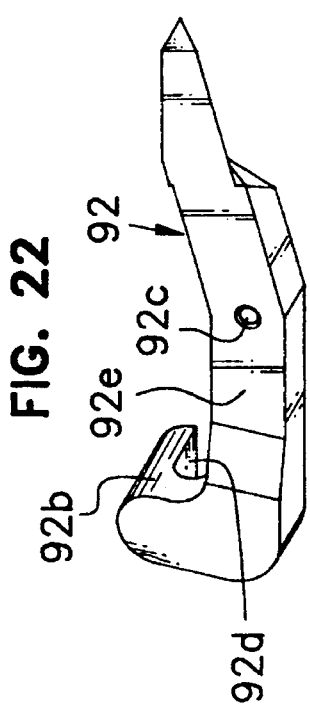

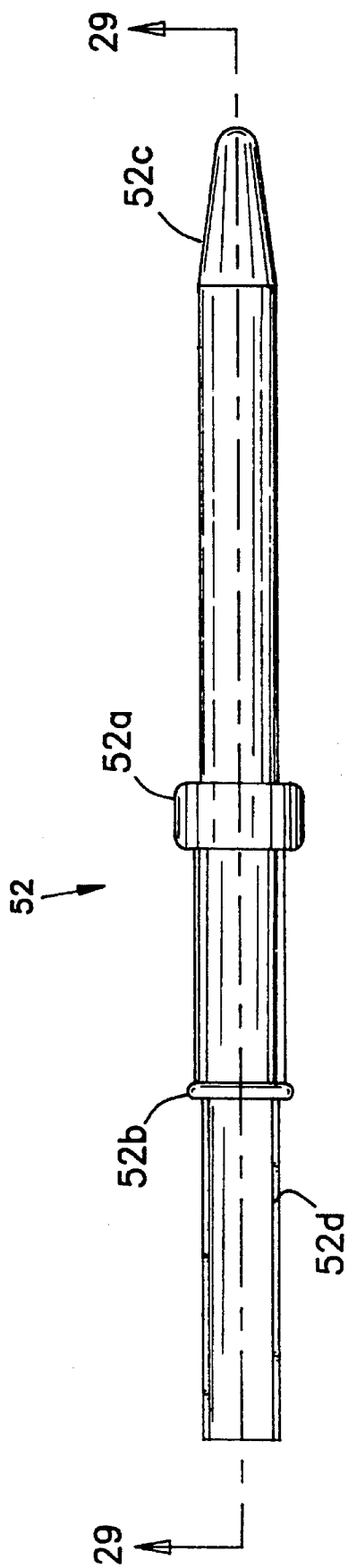
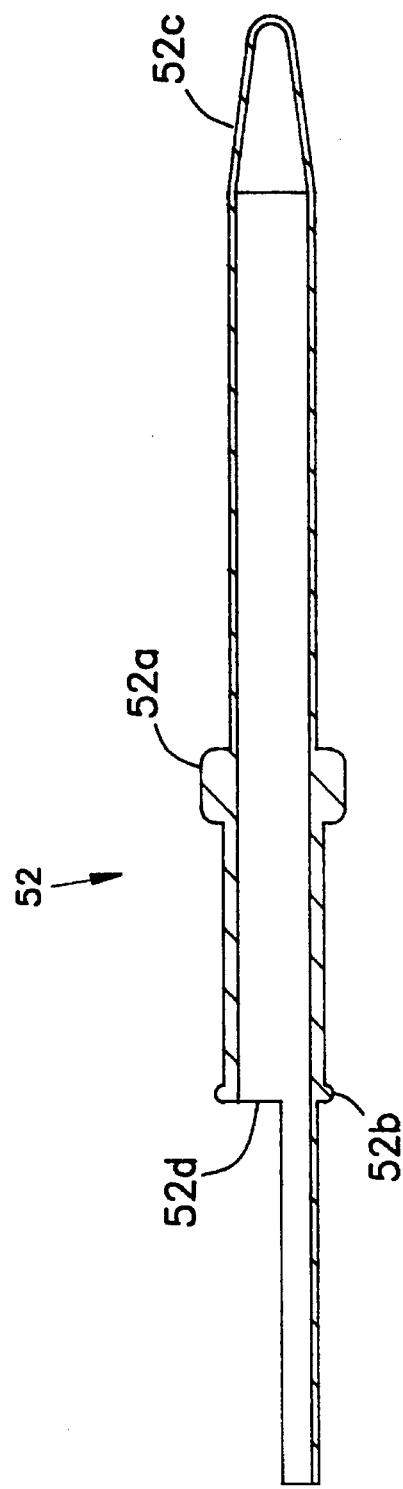
FIG. 28
FIG. 29

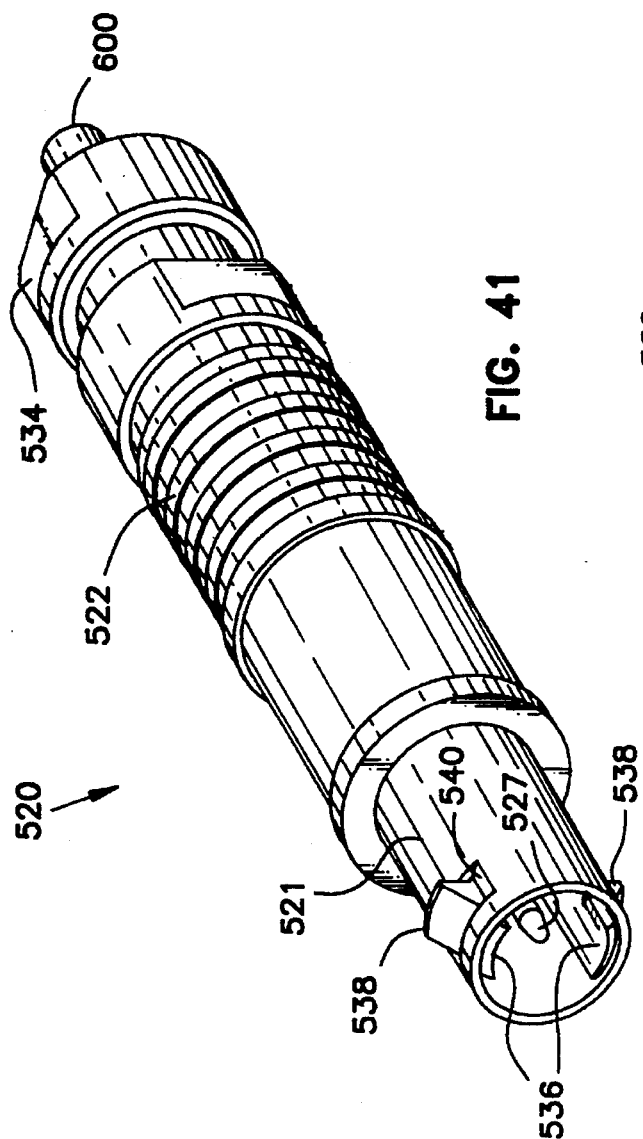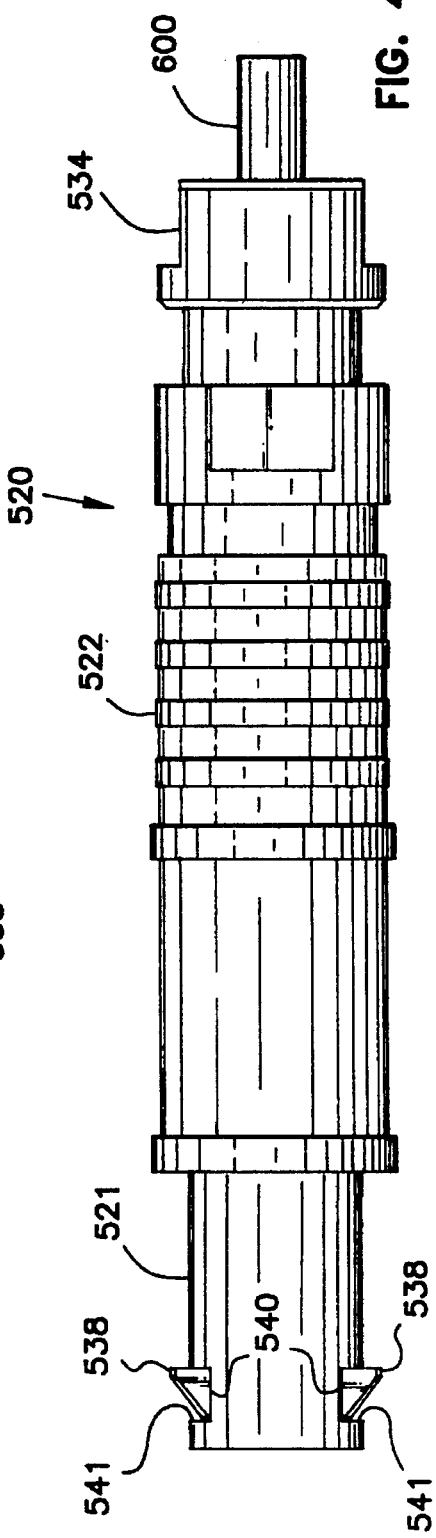

MINIATURE COAX JACK MODULE

The present application is a continuation of U.S. patent application Ser. No. 07/859,272 filed Apr. 2, 1992 now abandoned.

BACKGROUND OF THE INVENTION

1. Field of the Invention

This invention pertains to the telecommunications industry. More particularly, this invention pertains to a miniaturized coax jack for use in the industry.

2. Description of the Prior Art

As is commonly known in the telecommunications industry, high speed signal transmission rates require coaxial conductors. For example, so-called DS-3 signal rates (i.e., 44.736 megabits per second) are carried over coax cables.

In order to permit cross-connection, line monitoring and line access, the industry has utilized so-called DSX-3 coax coaxial jack modules to permit interconnection, cross-connection and the like. An example of such a module is shown in U.S. Pat. No. 4,815,104. As shown in the the above cited U.S. Pat. No. 4,815,104, the module includes internal switching assemblies (items 90 and 92 in the above cited patent) which receive coax plugs through ports in the forward face of the module. The switch assemblies are connected through coaxial cables (items 82, 84, 86, 88 of the cited patents) to coax connectors (items 74, 76, 78, 80 of the cited patents) on the rear of the module. The circuit schematic of the prior art module is shown in FIG. 6 of U.S. Pat. No. 4,815,104. The preferred embodiment shown in the U.S. Pat. No. 4,815,104 has cross-connect ports on the front panel of the module as well as cross-connect locations on the rear end of the module. As indicated in U.S. Pat. No. 4,815,104 (FIGS. 1 and 2 thereof), the prior art also included modules lacking cross-connect ports on the front of the module. In addition to cross-connect locations, the prior art modules include monitoring ports or jacks connected across a resistance drop to the module's internal transmission lines.

In the telecommunications industry, it is standard for a cross-connect system to operate at 75 ohms. Accordingly, the prior art modules are designed and constructed to have a 75 ohm impedance.

In the telecommunications industry, a central office or other location will have a substantial number of cross-connect modules arranged in bays. Due to the large volume required to house such modules and bays, it is becoming increasingly desirable to miniaturize DSX modules. Such miniaturization should permit switching, access and monitoring functions while maintaining desired impedance levels.

OBJECTS AND SUMMARY OF THE INVENTION

It is an object of the present invention to provide a miniaturized DSX-3 jack module. According to a preferred embodiment of the present invention, this object is achieved by providing a coax jack module having first and second coax conductors. A first conductive spring contact is biased into electrical contact with the first conductor and cooperates with the first conductor to generate a first capacitance. A second conductive spring contact is provided biased into electrical contact with the second conductor and cooperates with the second conductor to generate a second capacitance. An internal conductor electrically connects the first and second spring contacts. The internal conductor has an inductance selected to cooperate with the first and second capacitance for the jack to have the desired impedance. The object of the invention is further achieved by a jack module having grounded internal surfaces at least partially surrounding the module's internal conductors. The surfaces act as the grounding shield for coax conductors.

BRIEF DESCRIPTION OF THE DRAWINGS

FIG. 16 is a top plan view of a forward center conductor for use with the present invention;

FIG. 17 is a view taken along line 17—17 of FIG. 16;

FIG. 17A is an enlarged view of a left end of the conductor of FIG. 17;

FIG. 17B is an enlarged central portion of the conductor of FIG. 17;

FIG. 17C is an enlarged view of a right end of the conductor of FIG. 17;

FIG. 20 is a left side, bottom and rear perspective view of a cam for use with the present invention;

FIG. 20A is a rear, left side and top perspective view of the cam of FIG. 20;

FIG. 21 is a left side elevation view of the cam of FIG. 20;

FIG. 22 is a right side, bottom and front perspective view of the cam of FIG. 20;

FIG. 23 is a right side, top and front perspective view of the cam of FIG. 20;

FIG. 28 is a top plan view of a conductor pin;

FIG. 29 is a view taken along line 29—29 of FIG. 28;

FIG. 41 is a perspective view of a patch plug for use with the rear interface of FIG. 31;

FIG. 42 is a side elevation view of the patch plug of FIG. 41;

DESCRIPTION OF THE PREFERRED EMBODIMENT

Referring now to the several drawing figures in which identical elements are numbered identically throughout the drawings and the specification, a description of the preferred embodiment will now be provided.

A. GENERAL ASSEMBLY

Figure 1:
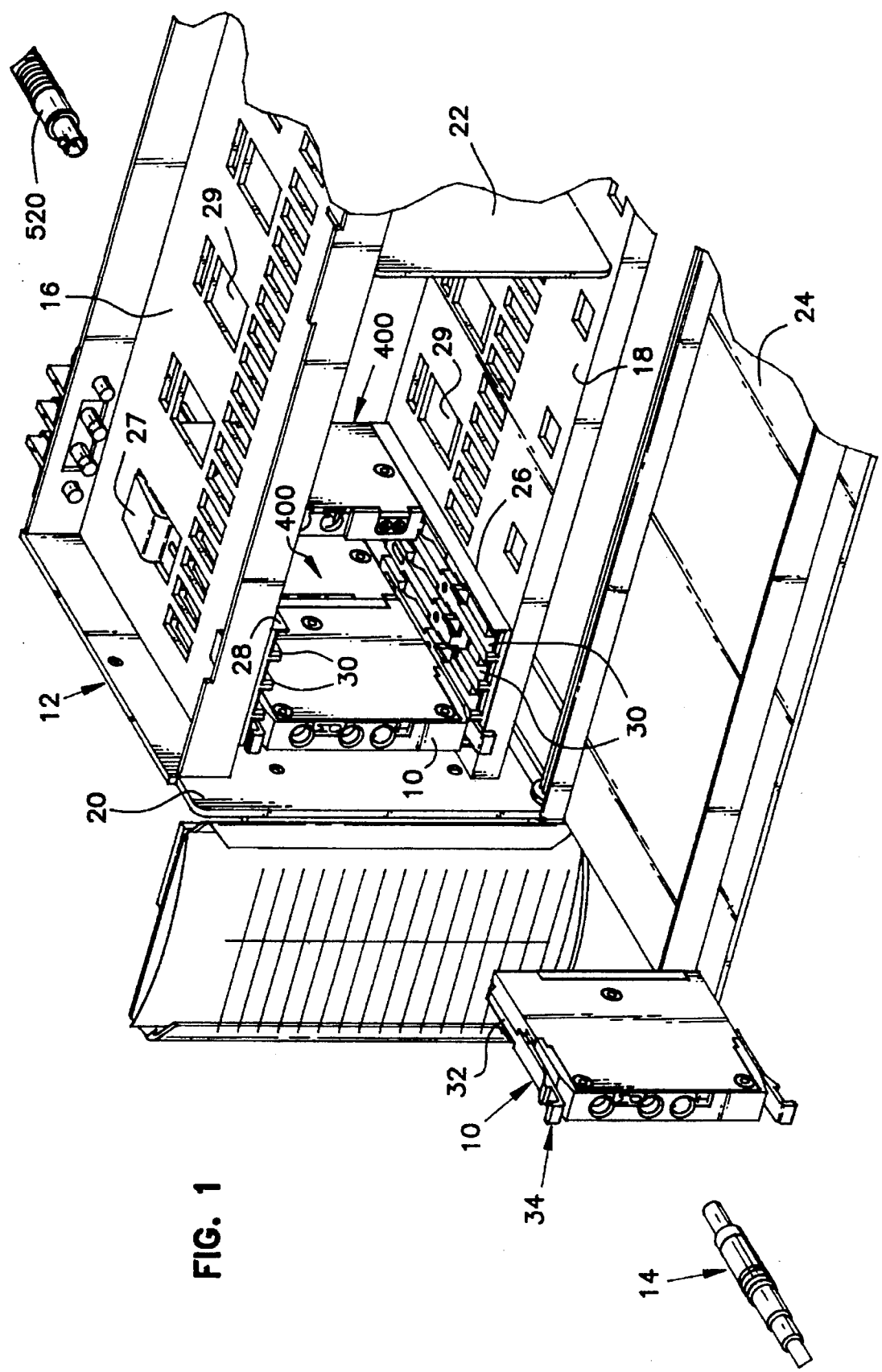
FIG. 1 is a perspective view showing a jack module according to the present invention in exploded relation to a chassis for receiving such module.

In FIG. 1, a jack module 10 according to the present invention is shown in a position to be inserted within a chassis 12. A jack plug 14 is shown in a position to be inserted into the jack module 10. A rear interface 400 is shown inserted within chassis 12. A rear interface plug 520 is shown in a position to be inserted into the rear interface 400.

As shown in FIG. 1, the chassis 12 includes sheet metal top and bottom walls 16,18 joined by side walls (only one of which is show at 20) and having sheet metal dividing walls 22. A front cover 24 is provided pivotally secured to the side walls 20 to permit the front cover 24 to be pivoted to a down position (shown in FIG. 1) thereby providing access to the interior of the chassis 12. The front cover 24 may be pivoted to an up position to cover the interior of the chassis 12.

Slide attachment blocks are secured within the chassis 12. The slide attachment blocks are dielectric and include a lower block 26 and an upper block 28. The blocks 26,28 include locking tabs 27 received within slots 29 in walls 16,18 to lock the blocks 26,28 to the interior opposing surfaces of wall 18,16, respectively.

The blocks 26,28 have vertically aligned grooves 30 sized to receive rails 32 on the jack module 10. The rails 32 permit jack module 10 to be slidably received with the chassis 12 in a vertical disposition (as shown in FIG. 1).

Each of blocks 28,26 cooperate to present grooves 30 sufficient to receive four jack modules 10. A jack module 10 is secured within the blocks 26,28 by locking tabs 34. It will be appreciated that slidably received jack modules with locking tabs 34 form no part of this invention per se. Examples of such are shown in commonly assigned U.S.

Pat. No. 4,840,568.

B. JACK MODULE DETAIL

1. Components

Figure 2:
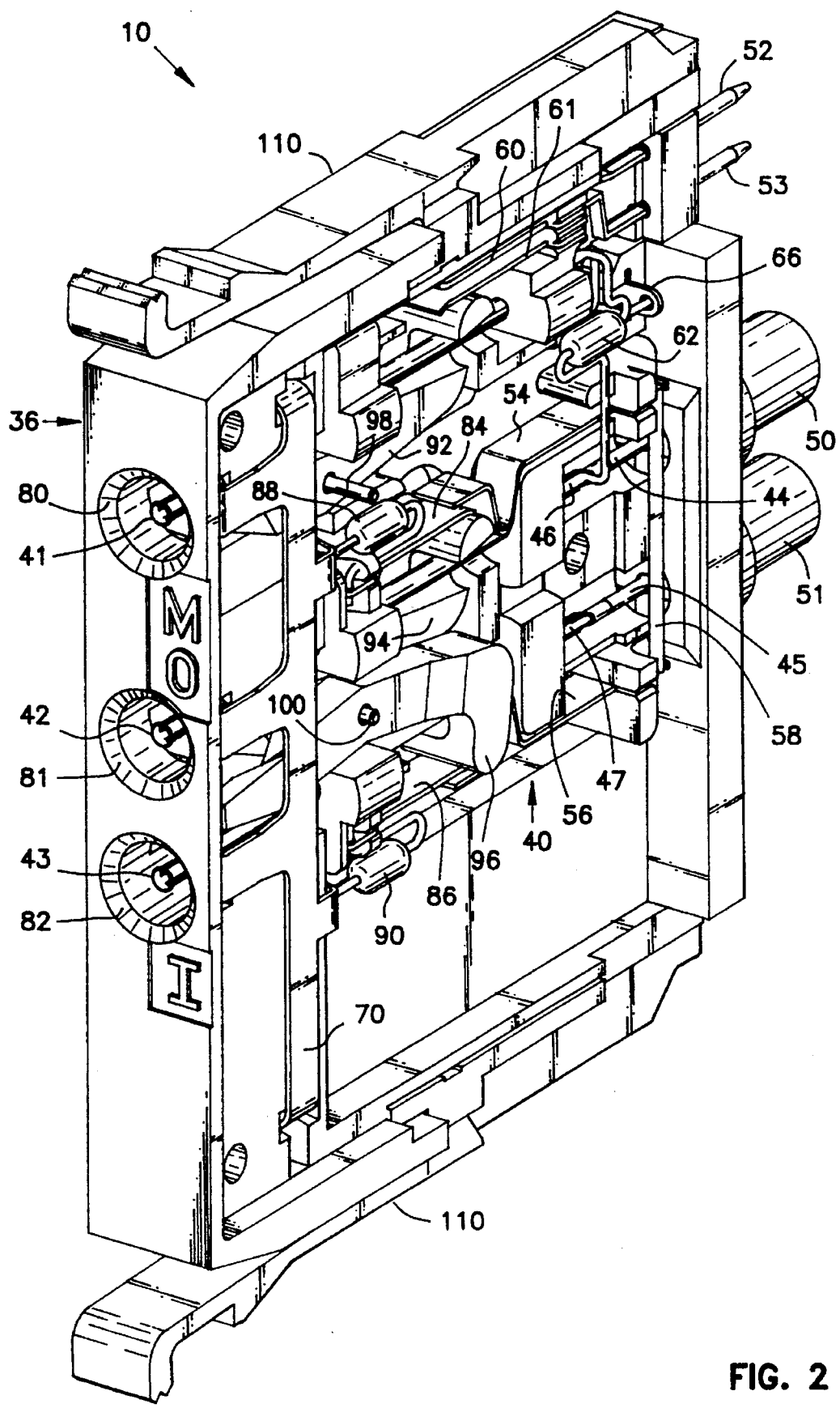
FIG. 2 is a perspective view of a jack module with a cover removed to exposed internal elements.
Figure 3:
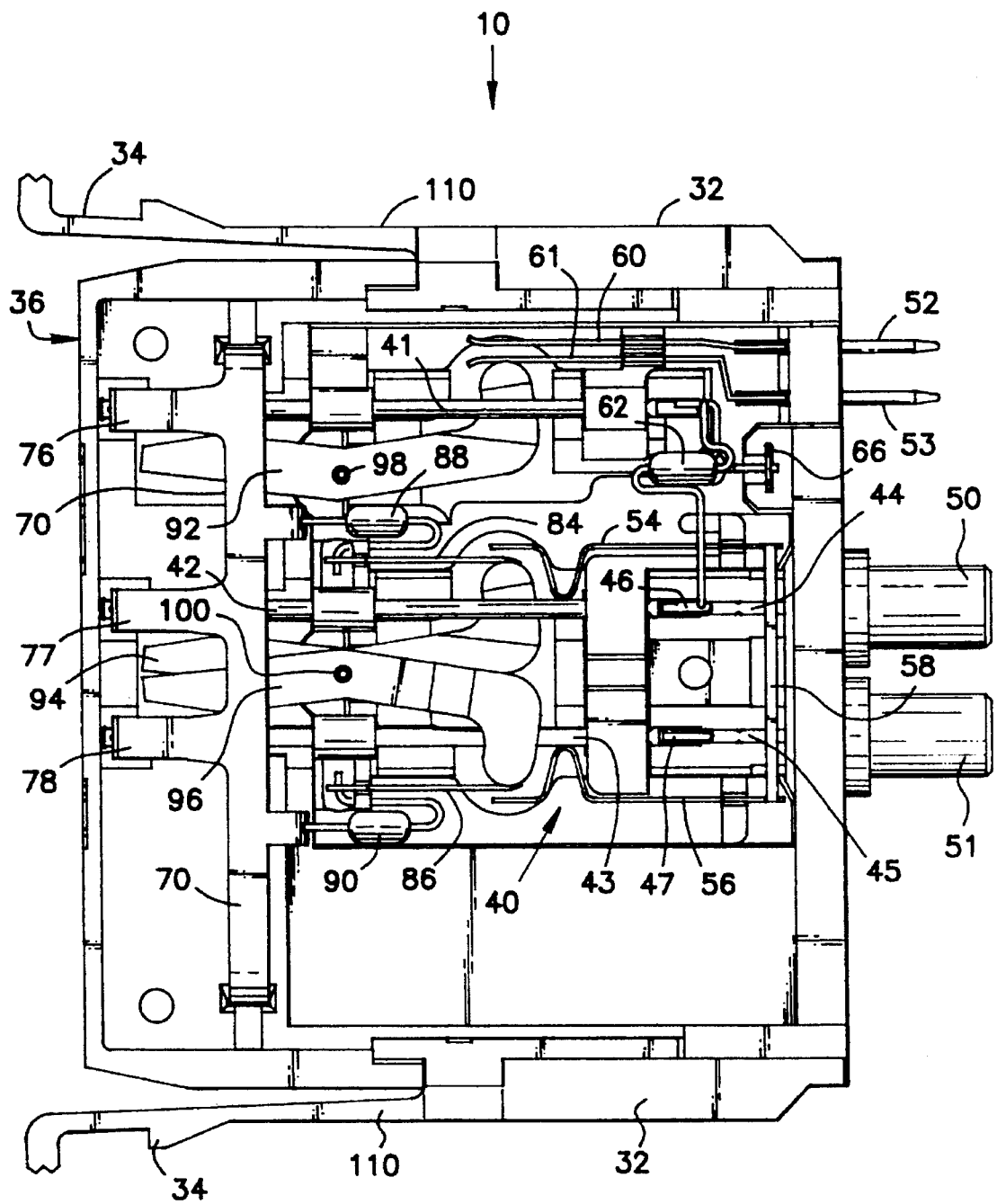
FIG. 3 is a side elevation view of the jack module of the present invention with a cover removed to show internal elements.
Figure 5:
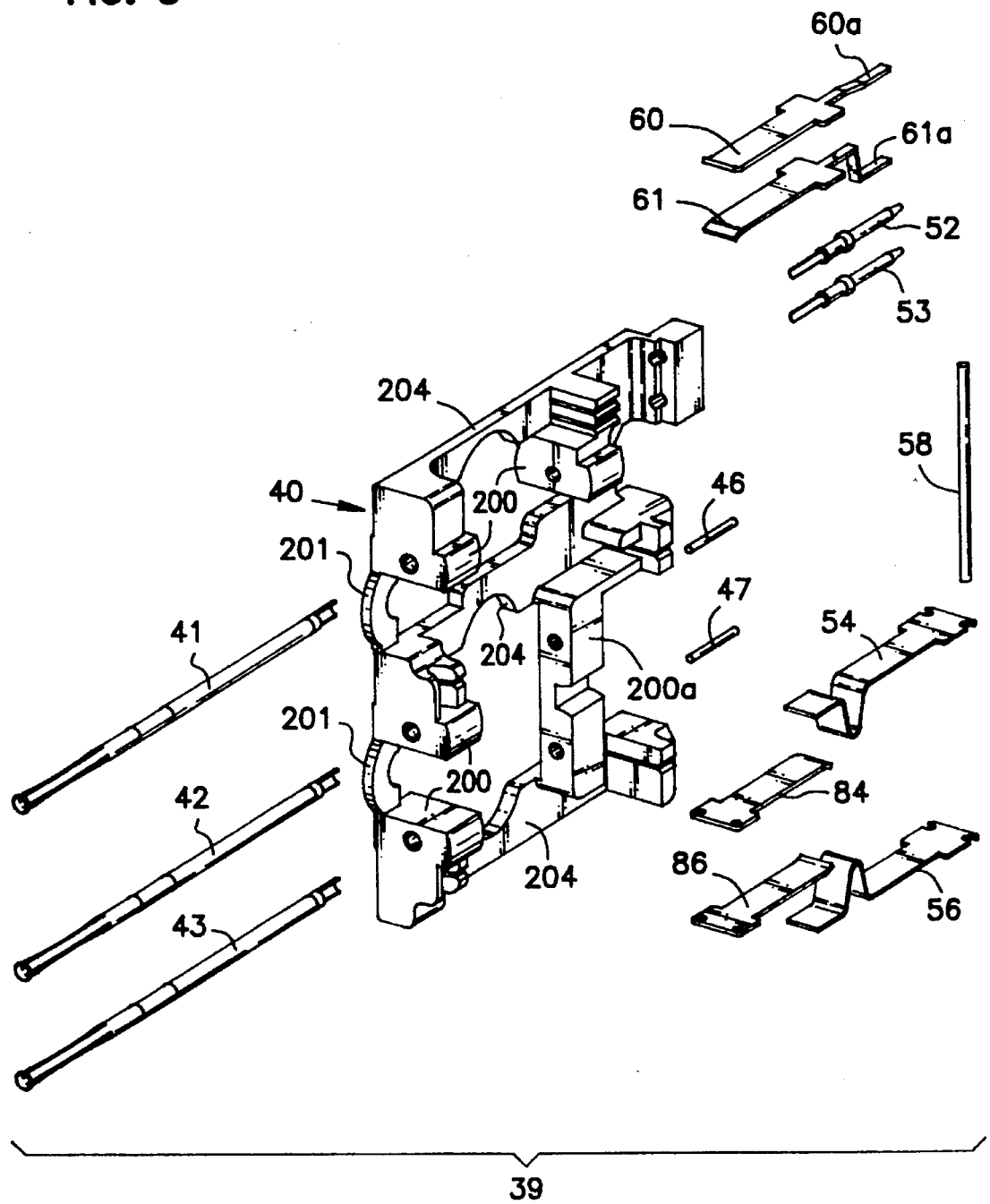
FIG. 5 is a perspective exploded view of the subassembly of FIG. 4.
Figure 6:
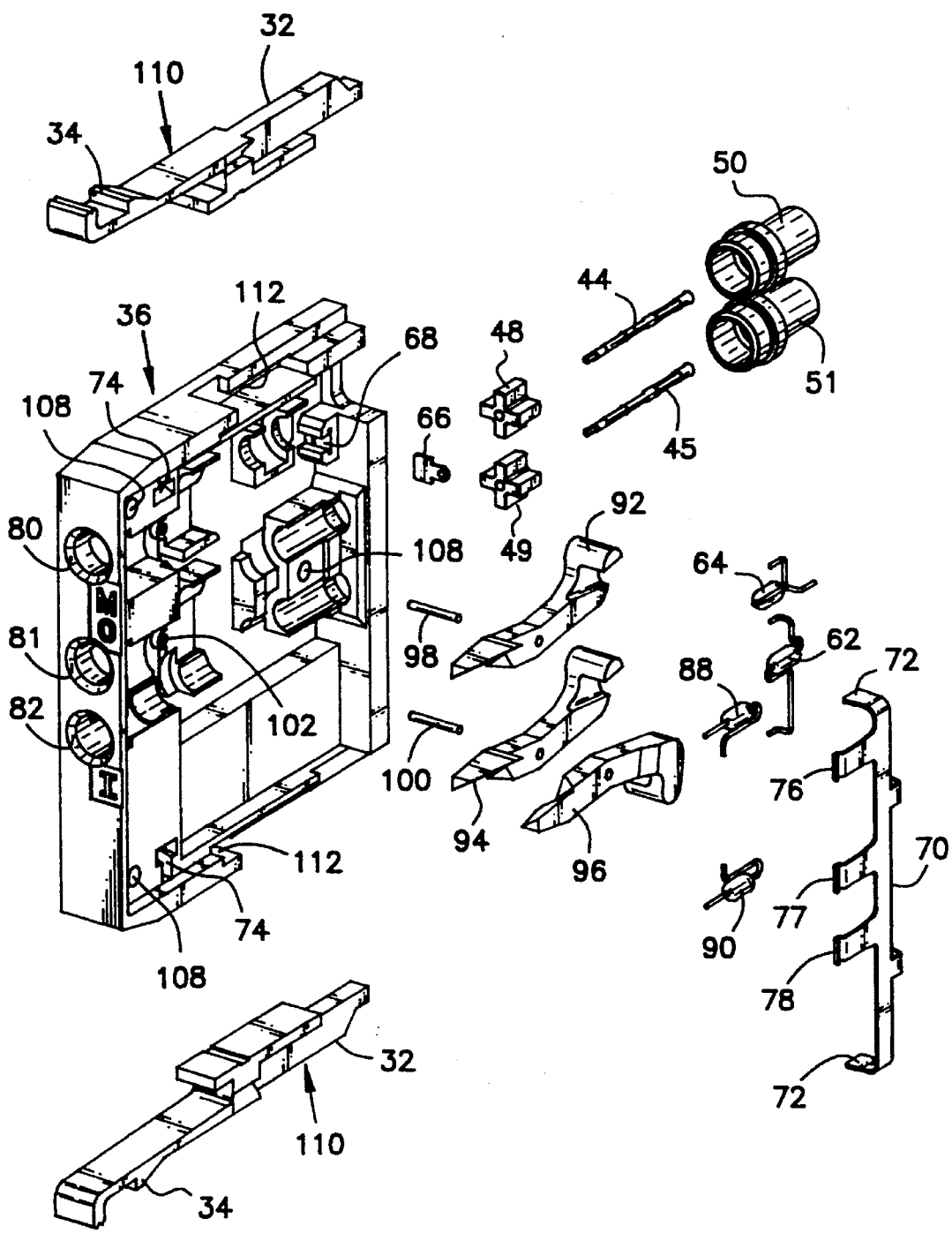
FIG. 6 is a perspective exploded view of the jack module less cover and the subassembly of FIG. 4.
Figure 8:
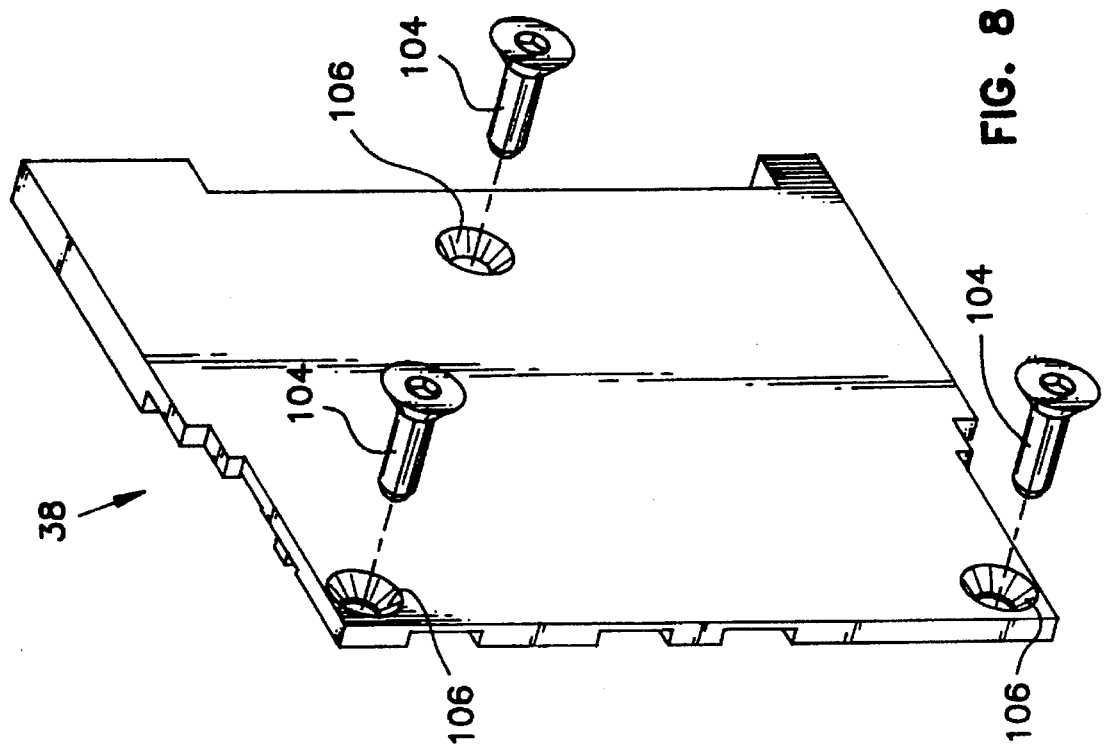
FIG. 8 is a perspective view of the cover of FIG. 7 showing an external surface and screws shown exploded.
Figure 7:
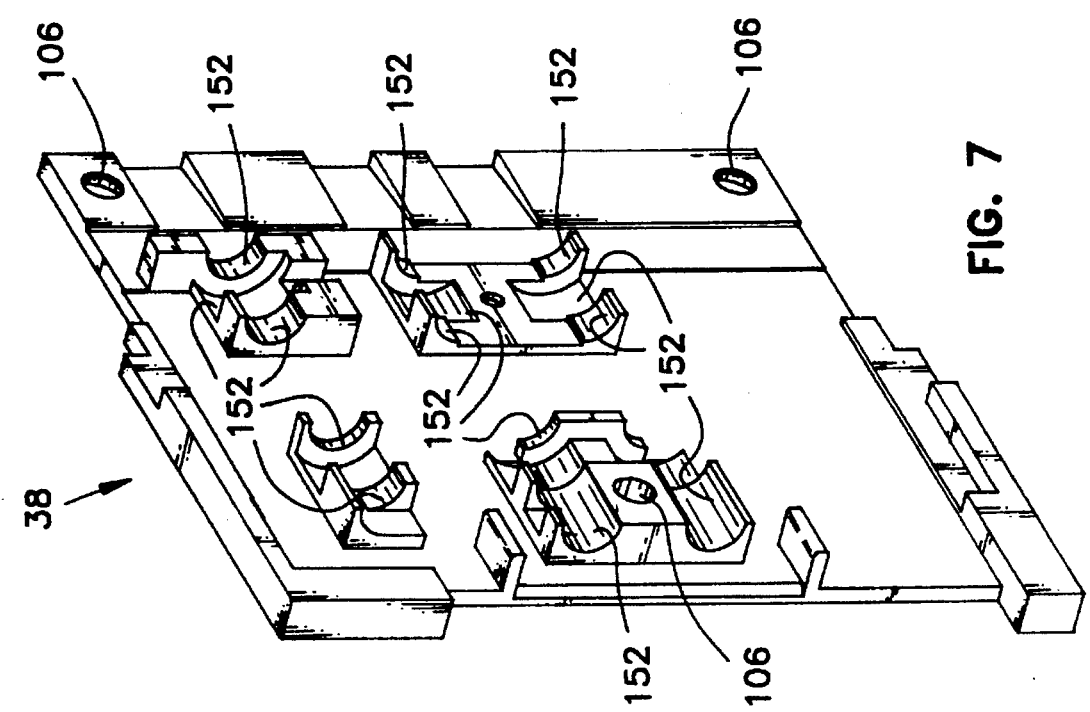
FIG. 7 is a perspective view of a cover for the jack module showing an interior surface of the cover.
Figure 9:
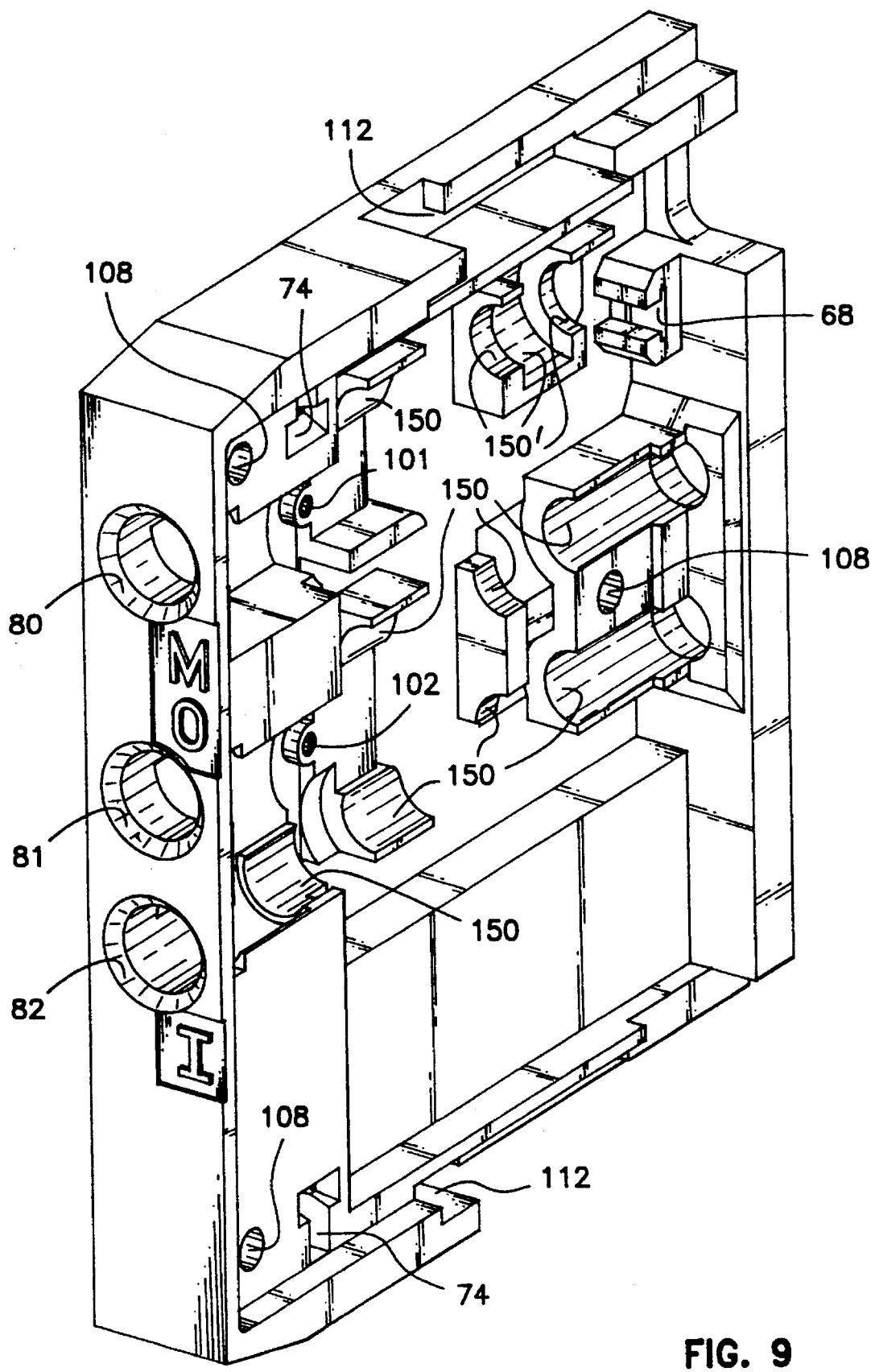
FIG. 9 is a perspective view of a housing of the jack module showing an interior surface of the housing.
Figure 10:
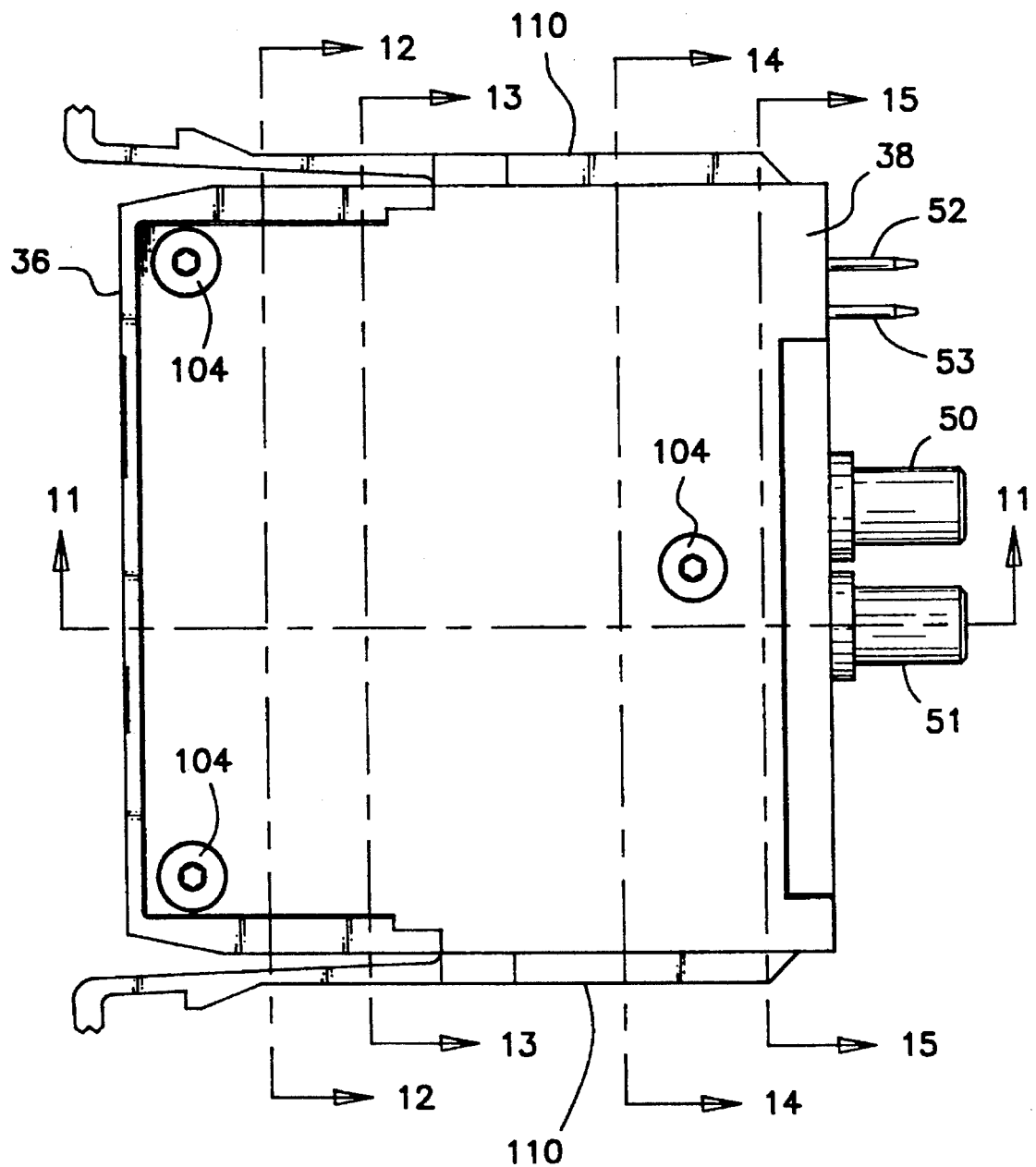
FIG. 10 is a side elevation view of the assembled jack module of the present invention.

FIGS. 5 (showing, in exploded form, subassembly 39) and 6 (showing, in exploded form, those portions of the jack model other than subassembly 39), taken in combination, show an exploded perspective view of the jack module 10 which is shown assembled with cover removed in FIGS. 2 and 3 and with cover 38 attached in FIG. 10. The module 10 includes a housing 36 and a cover 38 (see FIGS. 7–9). For reasons that will become apparent, housing 36 and cover 38 are preferably formed of diecast zinc. For purpose of clarity of illustration, housing 36 is shown in FIGS. 6, 8 and 9 with cover 38 removed. Cover 38 is shown separately in FIGS. 7 and 8. Cover 38 is shown in place on housing 36 in FIG. 10.

Figure 4:
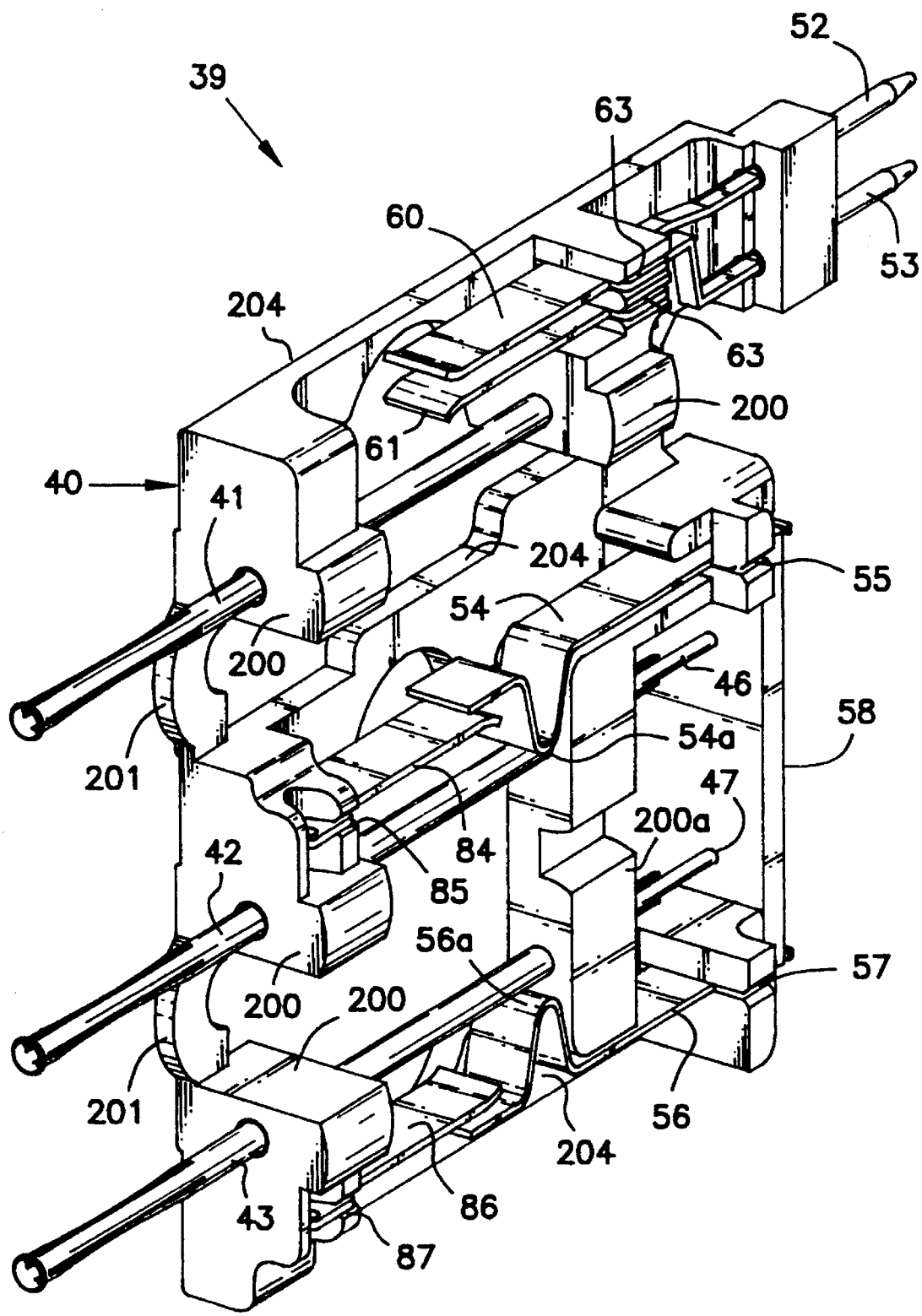
FIG. 4 is a perspective view of a subassembly of the jack module of the present invention.

A dielectric insert 40 (see FIG. 5) is provided sized to be received within the housing 36. As will be more fully described, insert 40 supports various electrical components in a desired orientation as a subassembly 39 (FIG. 4).

The internal components of module 10 include forward center coax conductors 41, 42 and 43 and rear coax center conductors 44 and 45 (see FIG. 6). Inductor wires 46,47 (see FIG. 5) are provided for joining coax conductors pairs 42,44 and 43,45, respectively. As shown in FIG. 6, insulators 48,49 are provided for supporting rear coax center conductors 44,45. Sleeves 50,51 are provided to permit attachment of the module 10 to a rear interface 400 (as will be more fully described).

The subassembly 39 includes power source contacts or conductor pins 52,53 (shown best in FIGS. 5, 28 and 29), an OUT normal spring 54, an IN normal spring 56 and an inductive cross-connect wire 58.

The electrical components further include springs 60,61. Pins 52,53 are identical. Pin 52 is shown in FIGS. 28 and 29. Pin 52 has a stop 52a and an annular ridge 52b. A pin 52c extends from stop 52a. A cut-out 52d is provided on an opposite end. Leads 60a (FIG. 5) of spring 60 are placed and soldered within cut-out 52d. Similarly, lead 61a of spring 61 is secured to pin 53.

As shown in FIG. 6, a first resistor 62 is provided for connecting the monitor (hereinafter "MON") coax conductor 41 with the OUT coax conductor 42 as will be more fully described. A second resistor 64 is provided for connecting the MON coax conductor 41 to ground by attachment of the second resistor 64 to a grounding clip 66 received within a slot 68 formed in housing 36.

Figure 26:
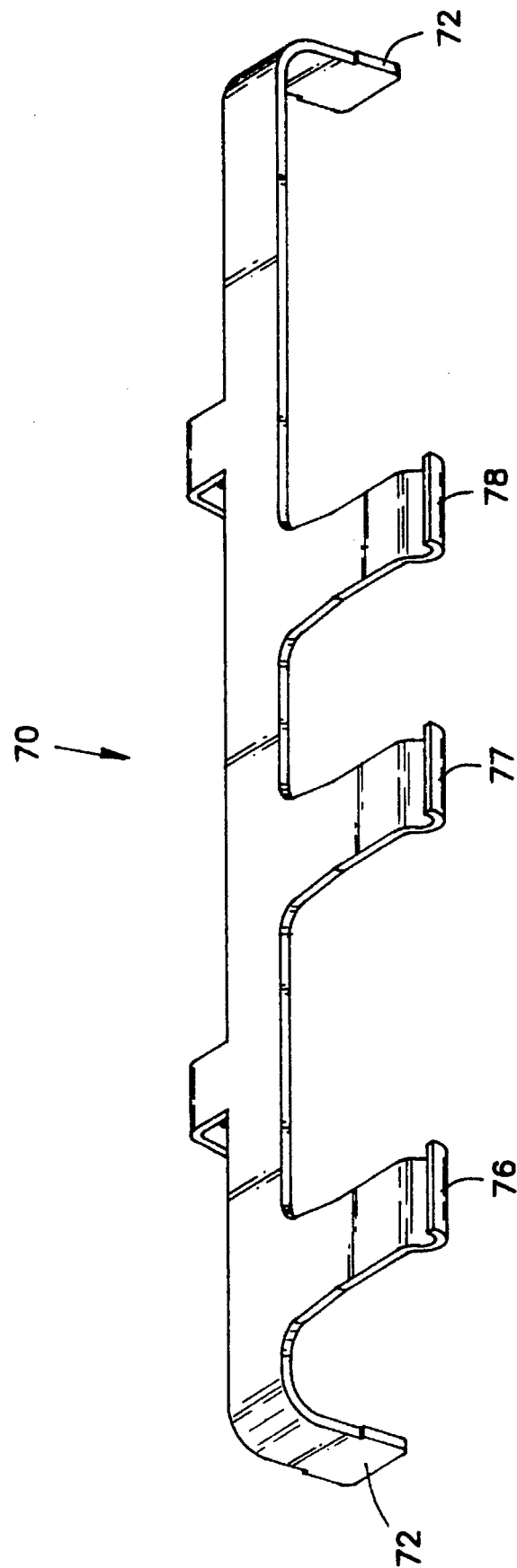
FIG. 26 is a perspective view of a grounding spring.

A main ground spring 70 (shown best in FIGS. 6 and 26) is provided having clip ends 72 sized to be received within slots 74 formed in housing 36. Reception of the clip ends 72 within slots 74 results in mechanical and electrical connection of the grounding spring 70 to the housing 36 (which is electrically grounded upon connection to a grounded rear interface 400 as will be described). The grounding spring 70 has spring contact ends 76, 77 and 78 disposed to be in sliding electrical contact with a plug (such as plug 14 of FIG. 1) received within the MON port 80, the OUT port 81 and the IN port 82, respectively, of housing 36.

The electrical elements supported by the dielectric insert 40 (FIG. 5) include an OUT termination spring 84 and an IN termination spring 86. A third resistor 88 (FIG. 6) is provided to electrically connect the OUT termination spring 84 with the grounding spring 70. Similarly, a fourth resistor 90 (see FIG. 6) is provided to electrically connect the IN termination spring 86 with the main grounding spring 70.

Figure 13:
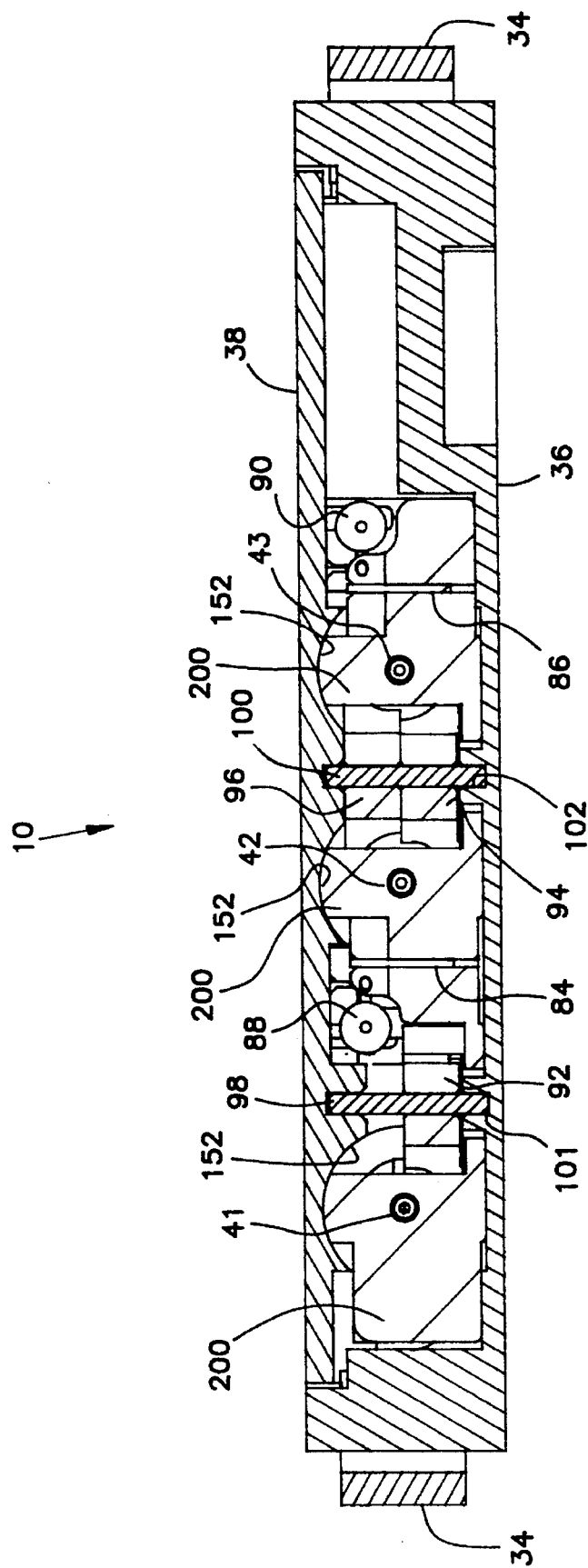
FIG. 13 is a view taken along line 13—13 of FIG. 10.
Figure 14:
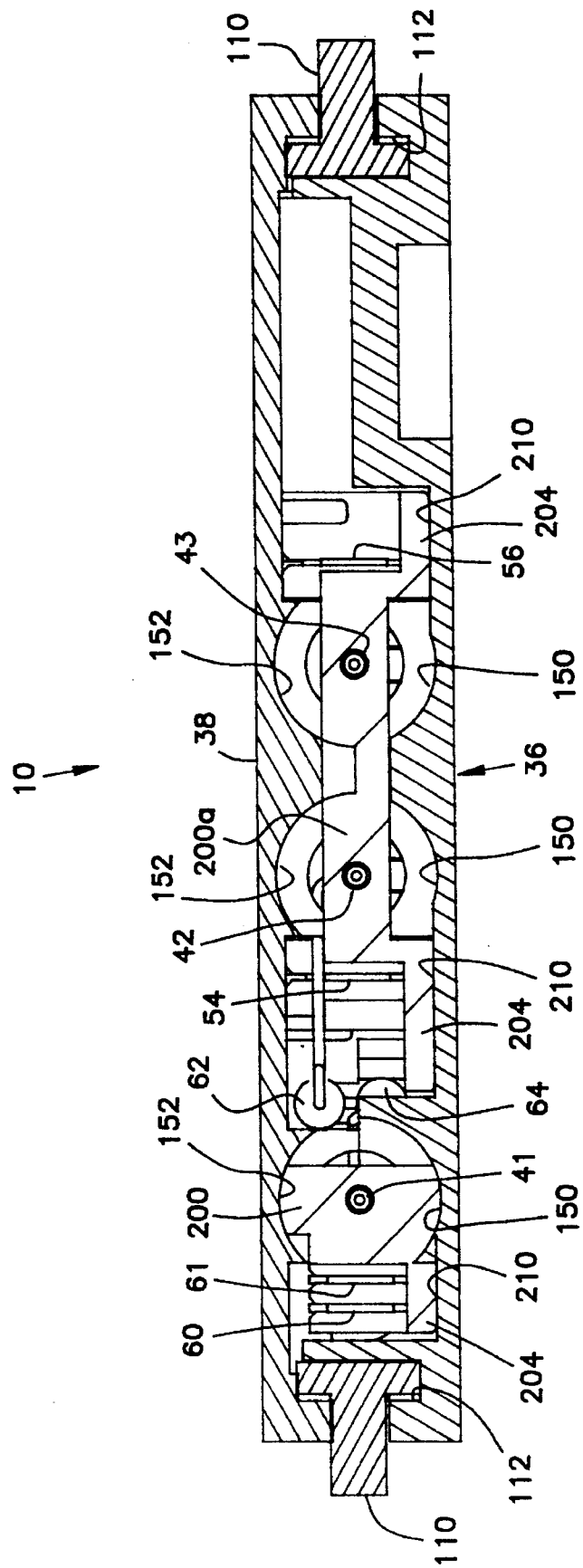
FIG. 14 is a view taken along line 14—14 of FIG. 10.
Figure 15:
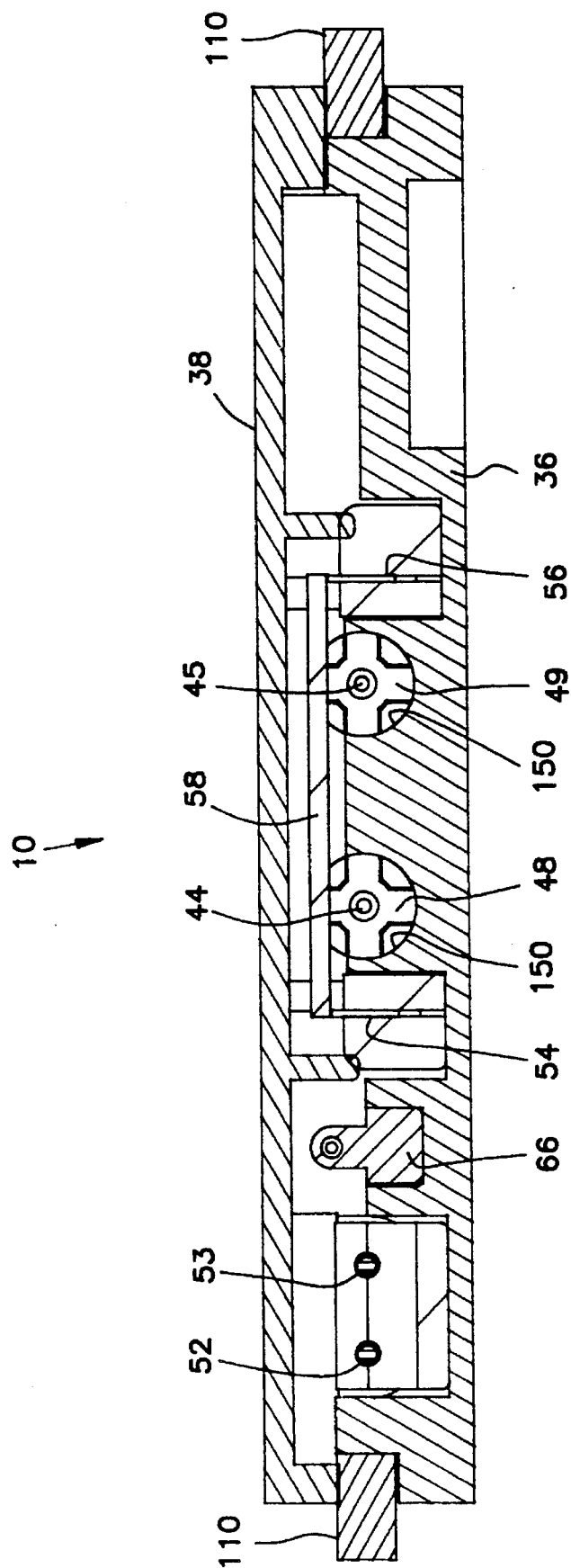
FIG. 15 is a view taken along line 15—15 of FIG. 10.
Figure 18:
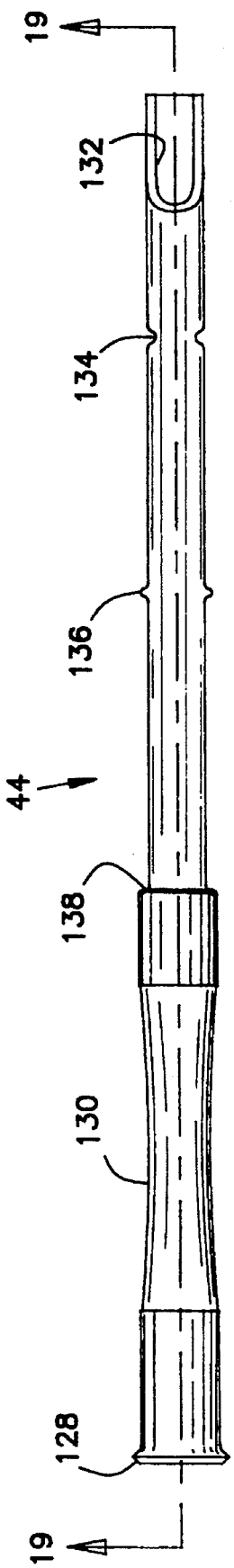
FIG. 18 is a top plan view of a rear center conductor for use with the present invention.

As will be more fully described and with initial reference to FIG. 6, the components of the jack module 10 include a MON cam 92, an OUT cam 94 and an IN cam 96 all of which are dielectric. MON cam 92 is pivotally connected to housing 36 through a first pivot pin 98. IN cam and OUT cam 96,94 are both pivotally connected to housing 36 through a second pivot pin 100 received within a bore 102 (FIG. 9). Shown in. FIGS. 6 and 13, a bore 102 is shown for receiving pivot pin 100 and a bore 101 (shown in FIG. 9) receives pin 98. Screws 104 (FIG. 8) are provided for securing cover 38 to housing 36 by passing the screws 104 through holes 106 (see FIG. 8) in cover 38 and receiving the screws 104 in aligned bores 108 (see FIG. 6) formed in housing 36.

Figure 27:
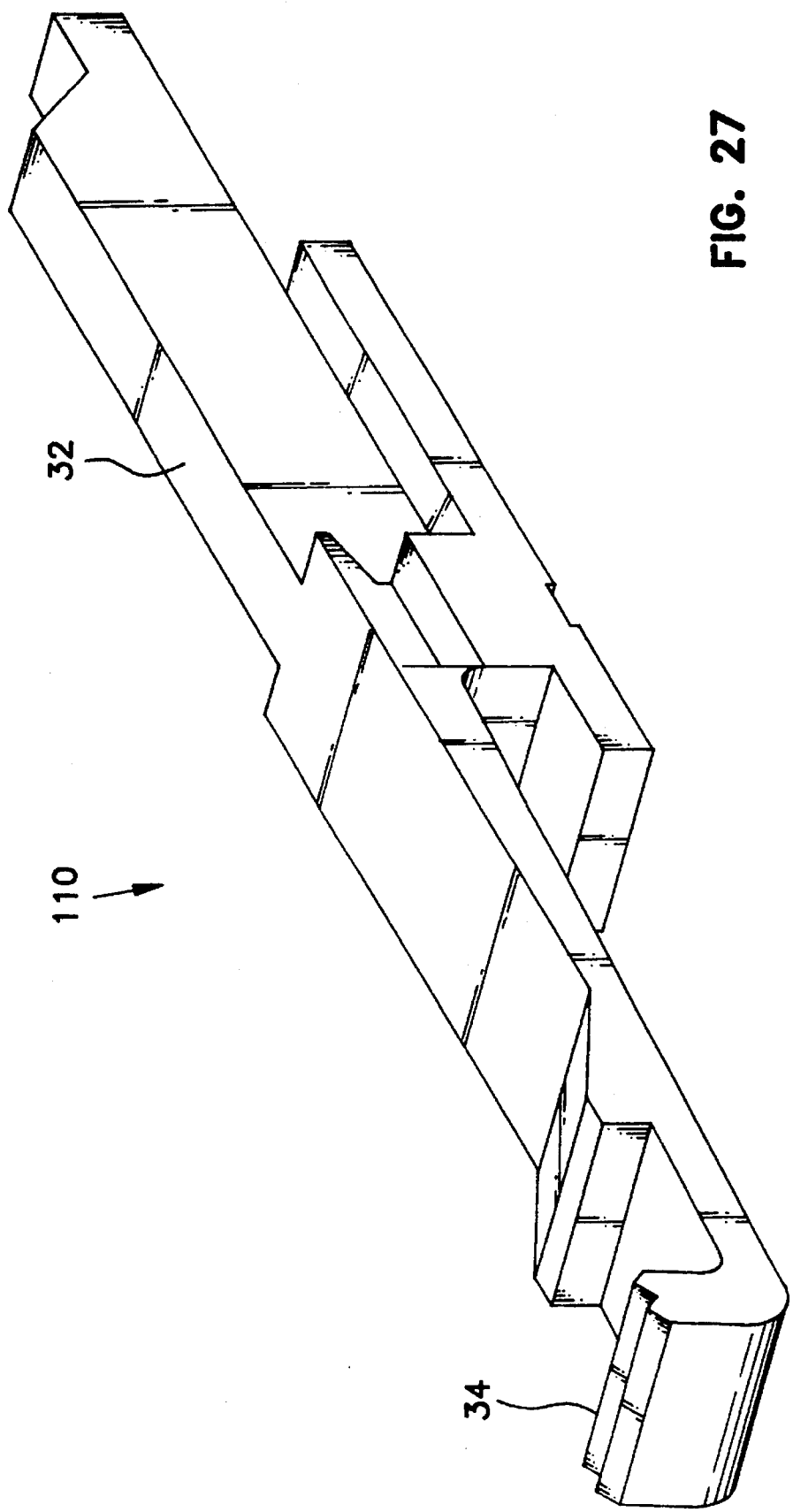
FIG. 27 is a perspective view of an attachment latch.

As shown in FIGS. 6 and 27, plastic attachment latches 110 (FIGS. 6 and 27) are provided received within grooves 112 (see FIG. 6) of housing 36. The attachment latches 110 include rails 32 for slidably receiving the module 10 within the chassis 12. The latches 110 also include the locking tabs 34 for locking the module 10 in place within the chassis 12.

FIG. 4 shows a subassembly 39 including the insert 40, the MON forward center conductor 41, the OUT forward center conductor 42 and the IN forward center conductor 43 illustrating how the conductors 41–43 are supported by the insert 40. Also, the conductors 52,53 are shown supported as are the OUT and IN termination springs 84,86 and the OUT and IN normal springs 54,56. Springs 54, 56, 84, 86 are retained within slots 55, 57, 85, 87 formed in insert 40. Springs 60,61 are supported in slots 63 formed in insert 40. The springs 60,61 are electrically connected (e.g. by solder) to pins 52,53. The complete assembly of components is shown inserted within the housing 36 in FIG. 3. In FIG. 3, cover 38 is removed.

Each of forward center conductors 41, 42 and 43 are identical. Conductor 41 is shown in greater detail in FIGS. 16, 17, 17A, 17B and 17C. A description of conductor 41 will suffice as a description of conductors 42 and 43.

The conductor 41 is a generally tubular conductive material. In a preferred embodiment, the conductor 41 is half hard phosphor bronze seamless tube having a nominal wall thickness of about 0.005 inches. The conductor 41 is plated to enhance electrical communication with a spring contact (as will be described).

As found in FIGS. 16, 17A, 17B and 17C the conductor 41 has a flared end 116 extending into an inwardly tapered portion 117. A center conducting pin of a plug 14 is inserted through flared end 116 and received within inwardly tapered portion 117. The tapered portion 117 has axial slots 119 to permit portion 117 to expand and receive pin 120 (see FIG. 30A). The inward taper provides releasable mechanical and electrical contact between the conductor 41 and the center pin 120.

Annular ridge 122 on conductor 41 permits positive placement of the conductor 41 in insert 40. The rear end of conductor 41 is provided with a cut-out 124 to permit placement of a wire (such as inductor wires 46,47) within conductor 41. A wire so placed may be soldered to conductor 41. An inwardly protruding annual dimple 126 prevents excessive solder flow from cut-out 124 into the interior of tubular conductor 41.

With reference now to FIGS. 18, 19A, 19B and 19C, rear conductor 44 is shown. Rear conductor 44 is identical to rear conductor 45 and a description of one will suffice as the description of the other.

Conductor 44 is formed of materials and plating similar to that of conductor 41 as previously described.

Figure 19:
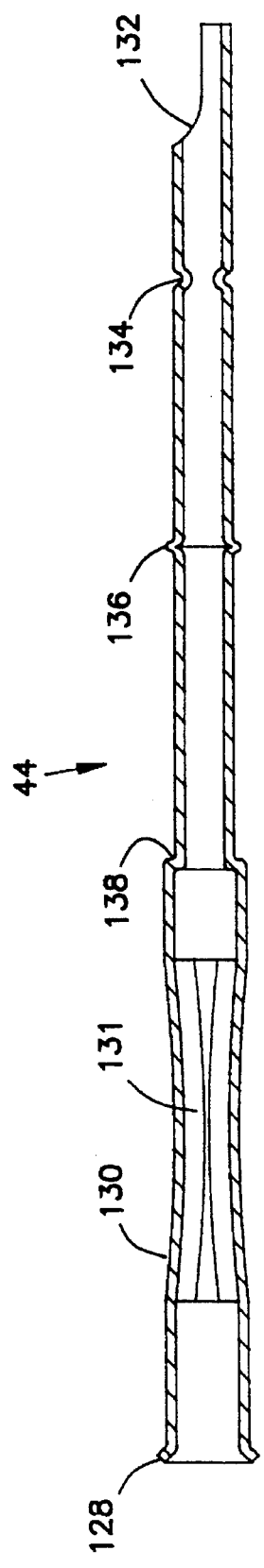
FIG. 19 is a view taken along line 19—19 of FIG. 18.
Figure 19C:
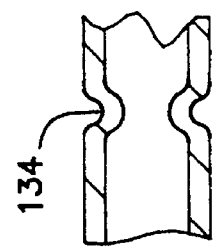
FIG. 19C is an enlarged view of a dimpled portion of the conductor of FIG. 19.
Figure 19B:
FIG. 19B is an enlarged central portion of the conductor of FIG. 19.
Figure 19A:
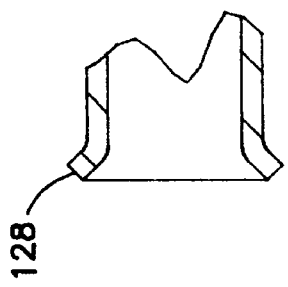
FIG. 19A is an enlarged view of a left end of the conductor of FIG. 19.

Rear conductor 44 includes a flared end 128 followed by an inwardly projecting tapered portion 130 having axial slots 131 (see FIG. 19). Similar to tapered portion 117 of conductor 41 (see FIGS. 16 and 17), tapered portion 130 receives a center conducting pin (not shown) in slidable mechanical and electrical contact. The conductor 44 also includes an opposite cut-out end 132 to receive a wire such as inductor wire 46,47 to be soldered in place. Inwardly projecting annular dimple 134 prevents excessive solder flow into conductor 44. The conductor 44 includes an annular ridge 136 and a stop surface 138. Ridge 136 and stop surface 138 cooperate to retain an insulator such as insulator 48,49 between ridge 136 and stop surface 138.

Figure 11:
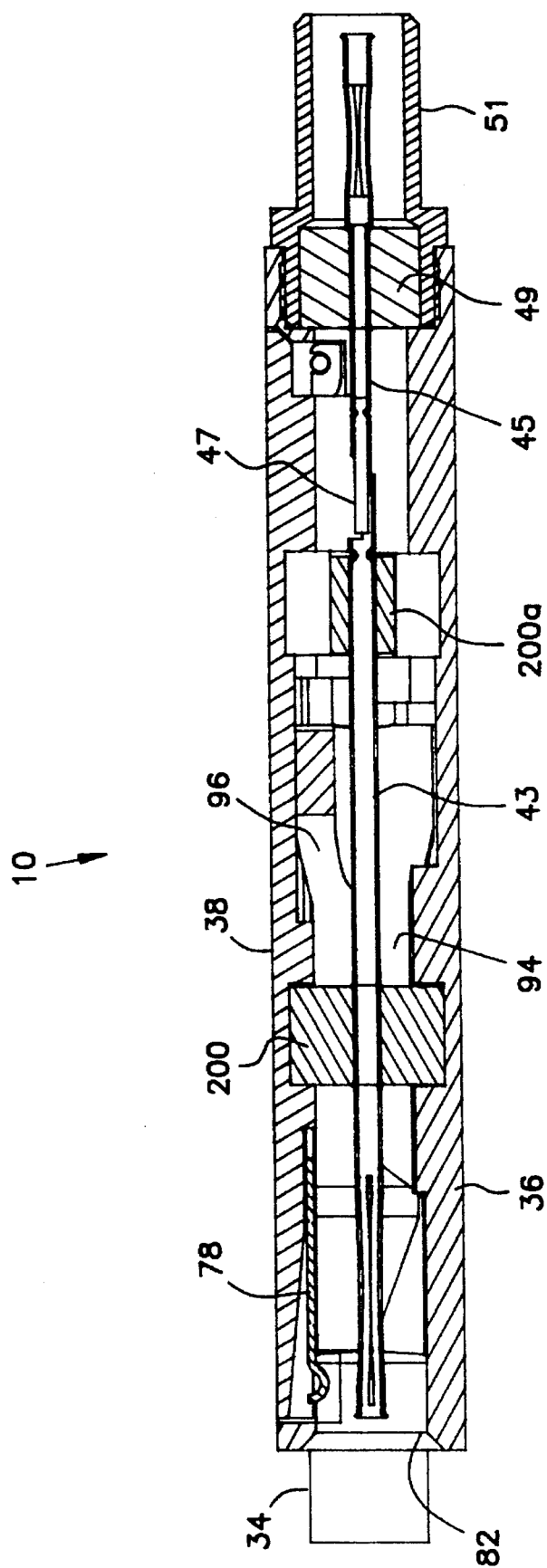
FIG. 11 is a view taken along line 11—11 of FIG. 10.
Figure 12:
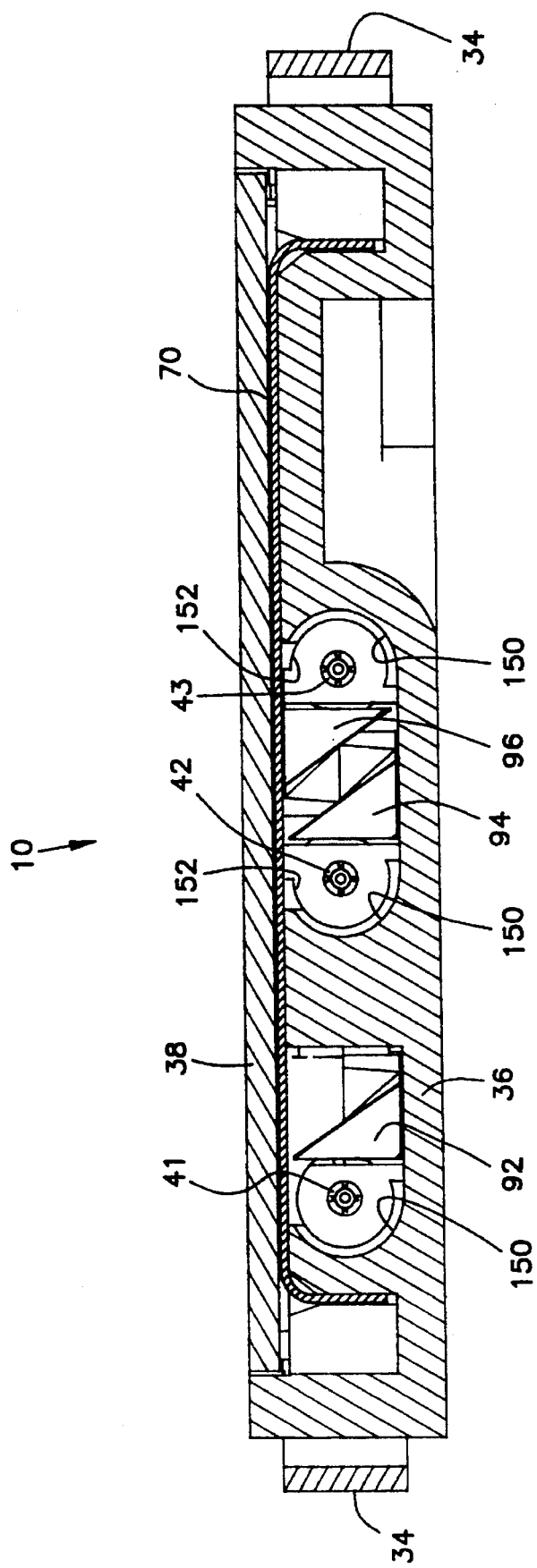
FIG. 12 is a view taken along line 12—12 of FIG. 10.

As best shown in FIG. 11, forward IN conductor 43 is electrically connected to rear IN conductor 45 through IN inductor wire 47. Similarly (as shown in FIG. 2), forward OUT conductor 42 is electrically connected to rear OUT conductor 44 through OUT inductor wire 46. The first resistor 62 is electrically connected to the OUT conductor 42 and the OUT forward center conductor 41.

With reference now to FIGS. 20, 20A, 21, 22 and 23, a description of MON cam 92 will be provided. MON cam 92 is identical to cams 94 and 96. Accordingly, a description of cam 92 will suffice as a description of cams 94,96.

The cam 92 has a centrally extending bore 92c extending through a lever body 92e. The bore 92c is sized to receive pin 98 (shown in FIG. 2) (or, in the case of cams 94,96, pin 100).

The cam includes a cam surface 92a disposed on one side of bore 92c. Disposed on the opposite side of bore 92c is a plunger 92b.

As best shown in FIG. 3, cam 92 is disposed for surface 92a to be engaged by a plug (such as plug 14 in FIG. 1) inserted within MON port 80. The plug pushes against surface 92a causing the cam 92 to pivot around pin 98 (or pin 100 in the case of cams 94,96). As a result, the plunger 92b urges the springs 60,61 together into electrical contact to close a circuit indicating insertion of a plug into the MON port 80.

OUT cam 94 is provided with its cam surface 94a disposed to be engaged by a plug inserted within OUT port 81 to cause plunger 94b to urge OUT termination spring 84 against OUT normal spring 54.

IN cam 96 is disposed for its cam surface 96a to be engaged by a plug inserted within IN bore 82 to urge cam 96 to pivot about pin 100 with plunger 96b urging IN termination spring 86 against IN normal spring 56.

As shown in FIGS. 20, 20A, 21, 22 and 23 the plunger 92b is provided with a slot 92d to permit unobstructed movement of the plunger without interference with conductor 41. Similarly, plungers 94b and 96b are provided with slots 94d and 96d to prevent interference with conductors 42 and 43, respectively.

As shown in FIG. 3, in the absence of a plug in any of ports 80–82, the cams 92, 94, 96 are urged by springs 61, 84, 86, respectively, to the positions shown in FIG. 3 with springs 60,61 separated and with spring 84 separated from spring 54 and with spring 86 separated from spring 56.

Springs 54 and 56 are provided with normal contact points 54a, 56a (see FIG. 4) disposed to electrically engage conductors 42,43, respectively. Cross-connect wire 58 (see FIGS. 3 or 4) electrically connects springs 56 and 54. Accordingly, in the absence of any plug inserted within ports 81,82, conductors 42 and 43 are electrically connected.

Figure 45:
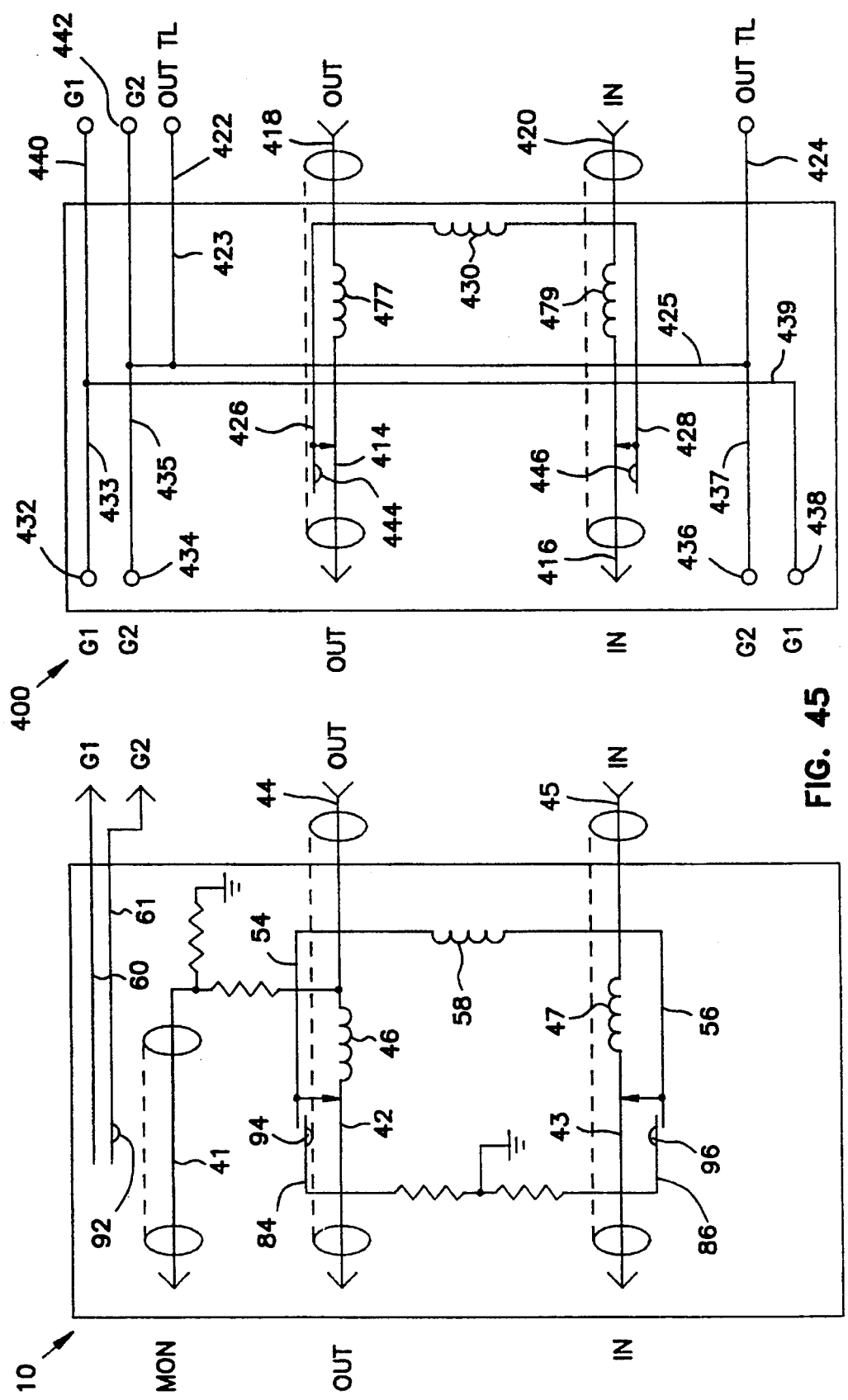
FIG. 45 is an electrical schematic of the circuitry of the jack module rear interface.

Upon insertion of a plug into port 82, the electrical connection between conductors 42,43 is broken and the OUT conductor 42 is connected across resistor 90 to ground. A signal on the IN conductor 43 is now connected directly to the plug (not shown) inserted into port 82. Similarly, upon insertion of a plug (not shown) into port 81, the IN conductor 43 is connected across resistor 88 to ground and the OUT conductor 42 is connected directly to the plug inserted within port 81. Insertion of a plug into port 80 results in closing springs 60,61. It will be recognized by those skilled in the art that an electrical schematic of the circuit thus described is common in DSX modules. A schematic of this circuit is shown in FIG. 45.

2. Impedance

As is common, coaxial conductors provide for a central conductor surrounded by a grounded shield. The present invention utilizes the geometry of the zinc housing 36 and zinc cover 38 to provide the grounded shield. This results in minimized volume of the module 10.

With best reference to FIGS. 7, 9 and 12–15, it can be shown how the housing is provided with concave arcuate surfaces 150 (see FIG. 9). Similarly, the cover 38 (FIG. 7) has concave arcuate surfaces 152. The surfaces 150,152 are disposed to at least partially surround conductors 41–45 when cover 38 is placed on housing 36. As a result, the surfaces 150,152 cooperate to define grounded shields at least partially surrounding conductors 41–45.

In addition to shielding as a result of arcuate surfaces 150,152 integrally cast into the housing 36 and cover 38, the impedance of the system is controlled by controlling the geometry of dielectric supports 200 (see FIGS. 13, 14) on insert 40.

The supports 200 are most clearly visible in FIGS. 4 and 5. As shown, the supports 200 are generally rectangularly shaped and are connected via cross-beams 201 to platforms 204 of insert 40. Support 200a joins two platforms 204. Comparing FIGS. 4 and 14, the platforms 204 are sized to be received within platform pathways 210 formed in housing 36.

The nesting of the insert 40 within housing 36 is best shown in FIGS. 11–15. The surfaces 150 cooperate with surfaces 152 to define partially cylindrical chambers through which the conductors 41–43 pass. The dielectric support blocks 200 are received in a portion of the partially cylindrical chambers.

The support blocks 200,200a, as previously indicated, are connected to the platforms 204 via cross bars 201. It will be recognized by those skilled in the art that by varying the geometry of the supports 200,200a, the impedance of the system can be tuned to a desired impedance.

In addition to supporting the conductors 41–43 in supports 200,200a, rear conductors 44,45 are supported in dielectric spacers 48,49 as shown in FIG. 11 (showing only spacer 49, sleeve 51, conductor 45. It being appreciated that, although not shown in FIG. 11, spacer 48, sleeve 50 and conductor 44 are similarly arranged). The spacers 48,49 are housed in a cylindrical portion of sleeves 50 and 51. Dielectric support spacers 48,49 of the geometry shown are also shown in U.S. Pat. No. 4,749,968 (items 250 in the figures of that patent) which indicates that the spacers can be selected to assist in tuning the system to a desired impedance.

Figure 25:
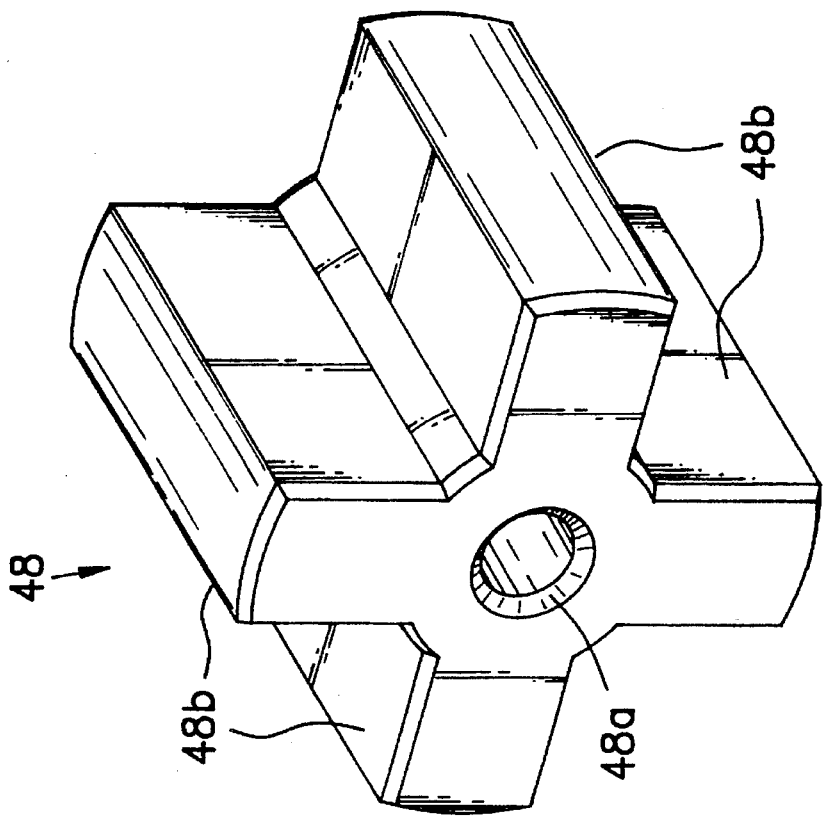
FIG. 25 is a perspective view of the support of FIG. 24.
Figure 24:
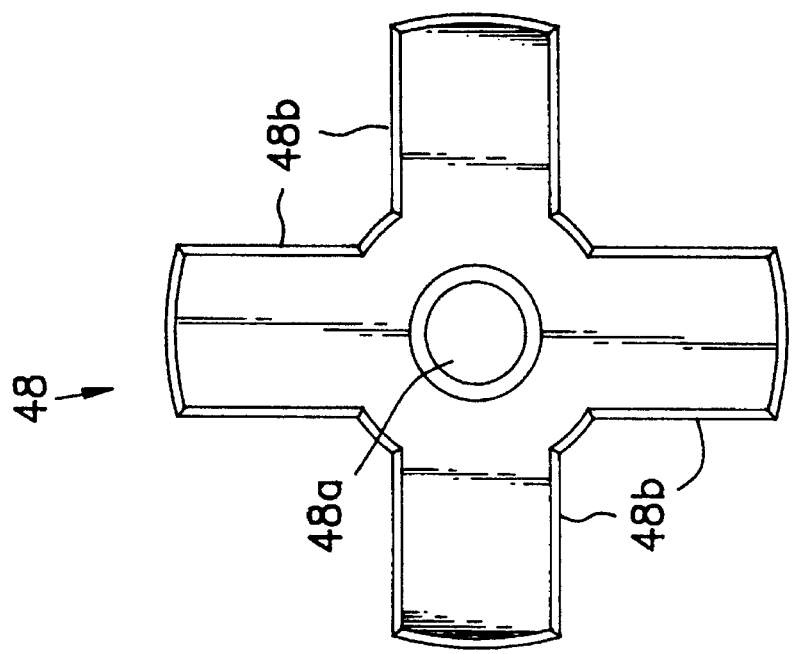
FIG. 24 is a front elevation view of a dielectric support.

Spacers 48,49 are identical. Spacer 48 is shown in FIGS. 24 and 25. The spacer 48 includes a bore 48a for receiving conductor 44 and radially spaced ribs 48b.

The conductors 42, 43, 44 and 45 cooperate with the inductors 46,47 and insulators 48,49 and supports 200,200a to create a desired impedance. Notwithstanding this tuning, the presence of springs 56,54 can result in an imbalanced or undesired impedance for the module 10. With best reference to FIG. 3, it is noted that springs 54,56 reside generally parallel to conductors 42,43 and inductors 46,47. As a result of this parallel geometry, a first capacitance is generated between spring 56 and conductor 43 and a second capacitance is generated between spring 54 and conductor 42. To balance these capacitances, an inductance is provided via conductor 58. The specific gage of conductor 58 is selected to balance the capacitance resulting from the spacial relation of spring 56, inductor 47, conductor 43 and spring 54, conductor 42 and inductor 46. The inductance of inductors 46,47 and cross-wire 58 are matched with the capacitance of springs 54,56 to provide impedance matching.

C. PLUG DETAIL

From the foregoing, a description of module 10 has been provided. In addition to the module, a plug 14 is shown in FIG. 30A. The plug 14 includes a central conductor 300 terminating at central pin 120. The conductor 300 has a central exposed slot 302 for receiving a central conductor 304 of a coax cable 306. A crimp connection 308 is provided for crimping the shield of the coax cable 306 to an outer-conductive shield 310. The shield 310 narrows to a plug end 312 surrounding central pin 120. As shown in FIG. 30A, a portion of shield 310 is removed to provide an access opening 320 to permit wire 304 to be laid into slot 302 and secured through any suitable means such as soldering and the like.

Figure 30:
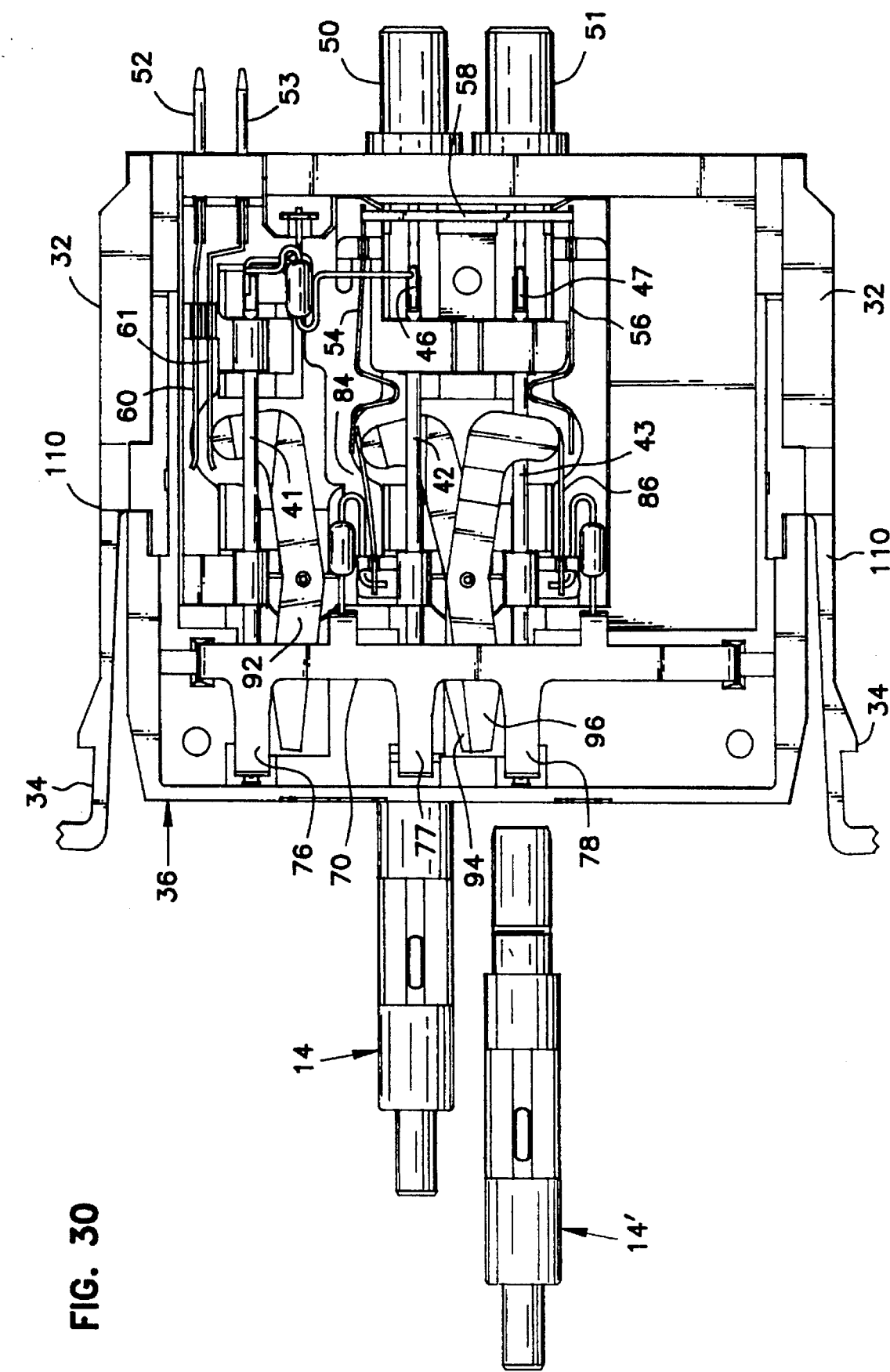
FIG. 30 is a top plan view of the jack of the present invention with cover removed to show internal elements and with a first plug shown inserted and a second plug shown about to be inserted.
Figure 30A:
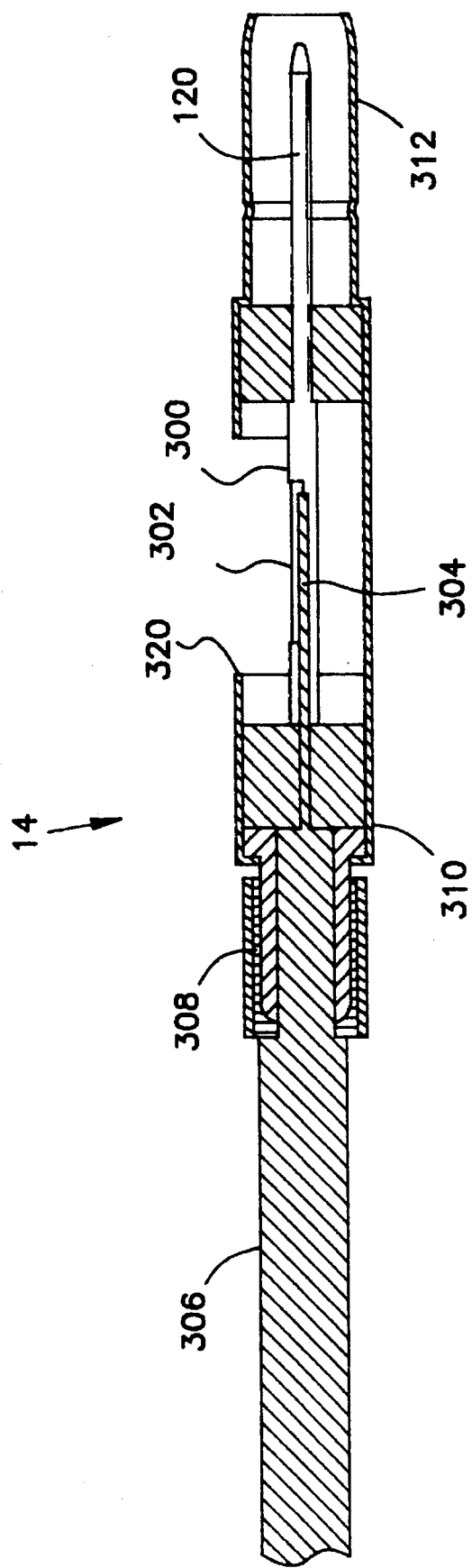
FIG. 30A is a cross-sectional view of a plug.

FIG. 30 shows the module (cover removed) with plugs 14,14' fully inserted into the OUT port 81 and positioned to be inserted into the IN port 82. As a result of the full insertion into the OUT port 81, the cam 94 is urged to force the spring normal contact 54 away from the central conductor 42. Since the plug 14' is not yet inserted into the IN port 82, the cam 96 has not been moved to urged the IN normal spring 56 away from the OUT conductor 43.

D. REAR INTERFACE DETAIL

In certain applications, it is desirable that signals which would otherwise be provided to conductors 42,43 be electrically connected when a module 10 is not inserted within housing or chassis 12. To accommodate this, rear interface 400 is provided.

Figure 31:
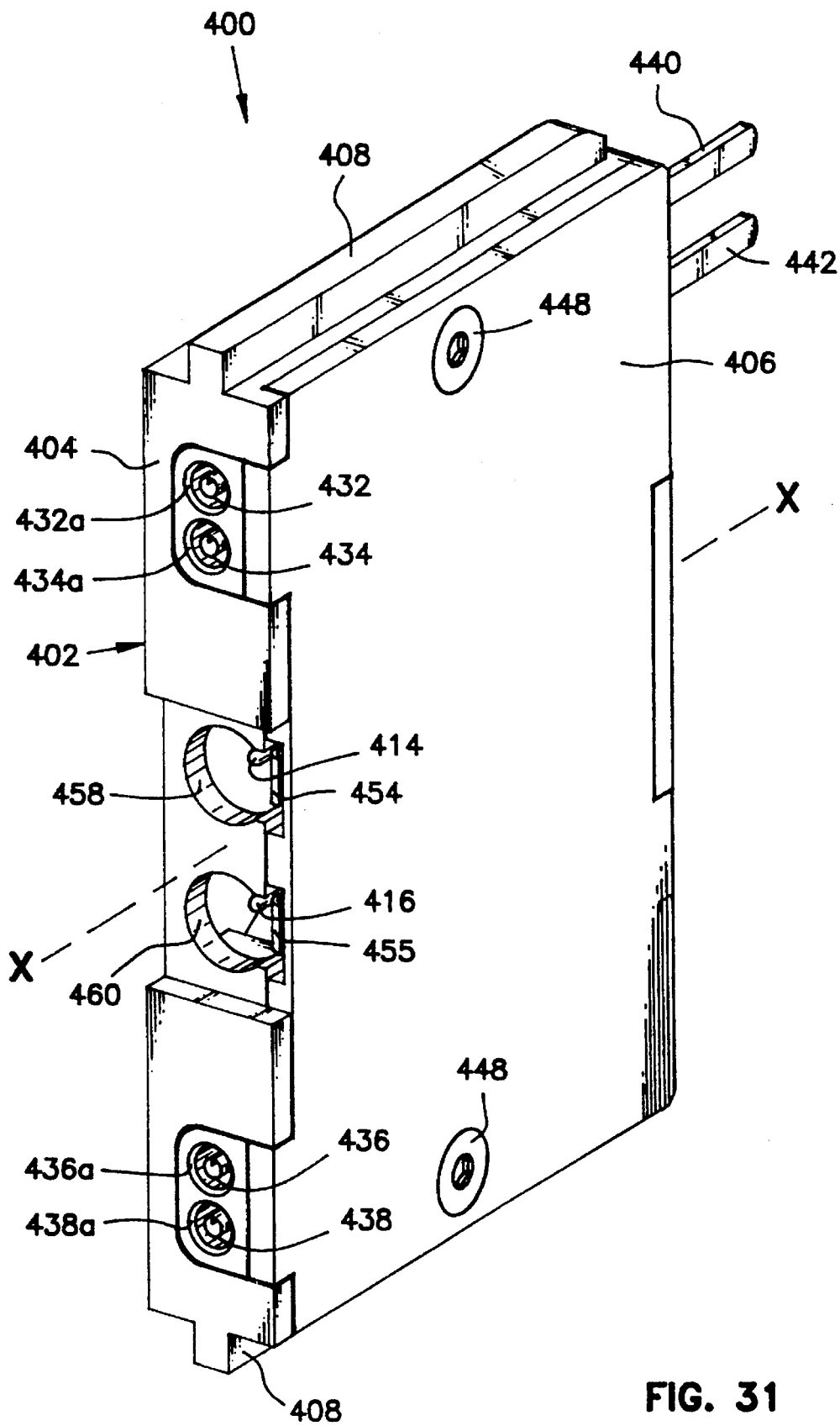
FIG. 31 is a front, top and right side perspective view of a rear interface of the present invention.

With initial reference to FIG. 31, rear interface 400 includes a housing 402 consisting of a housing body 404 and a housing cover 406. The housing body 404 has rails 408 sized to be received within grooves 30 (see FIG. 1). Accordingly, rear interface 400 may be slid into grooves 30 to the rear of blocks 26,28 and snap fit in place. The housing 402 has the approximate width of jack module 10.

Figure 39:
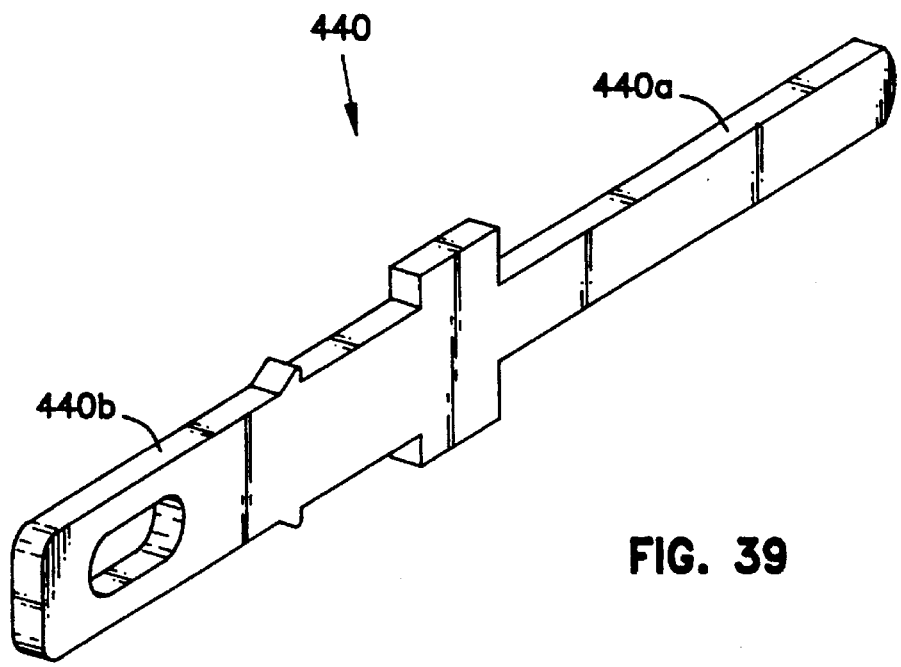
FIG. 39 is a perspective view of a wire wrap pin for use with the rear interface of FIG. 31.
Figure 40:
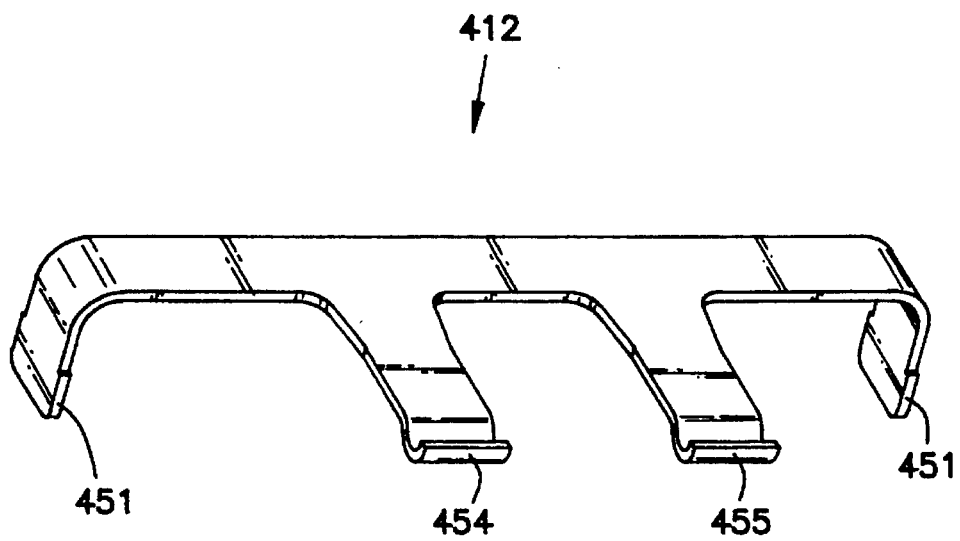
FIG. 40 is a perspective view of a grounding spring for use with the rear interface of FIG. 31.

Opposing surfaces of body 404 (see FIG. 32) and cover 406 cooperate to define a rear interface interior which contains a plurality of components. Shown exploded in FIG. 32, the components include a dielectric support platform 410, (shown separately in FIG. 33) a grounding spring 412 (FIG. 40), an OUT pin conductor 414 (FIG. 38) and an IN pin conductor 416. The internal components also include an OUT pin receiving conductor 418 (FIG. 37), an IN pin receiving conductor 420, a first plug receiving conductor 422 (FIG. 36) and a second plug receiving conductor 424. The components still further include an OUT spring 426, an IN spring 428, and a connecting conductor 430. The components still further include four pin receiving conductors 432, 434, 436, 438, two wire wrap pins 440,442 (one of which is shown in FIG. 39) and OUT dielectric cam 444 and IN dielectric cam 446.

Screws 448 (see FIG. 32) are provided to be received within a aligned holes 450 (see FIG. 34) of cover 406 and body 404 to connect cover 406 to body 404 and enclose the interior components of the rear interface 400. For reasons that will become apparent, body 404 and cover 406 are both electrically conductive and, preferably, are formed of die cast zinc.

The ground spring 412 is provided with clip ends 451 sized to be received within slots 452 formed in body 404. Reception of the clip ends 451 within slots 452 results in mechanical and electrical connection of the grounding spring 412 to the housing body 404 (which is electrically grounded upon connection of patch plug with coax conductor to the interface 400). The grounding spring 412 has spring contact ends 454,455 disposed to be within sliding electrical contact with sleeves 50,51, respectively, when received within a first OUT port 458 and a first IN port 460, respectively, formed in body 404.

Figure 33:
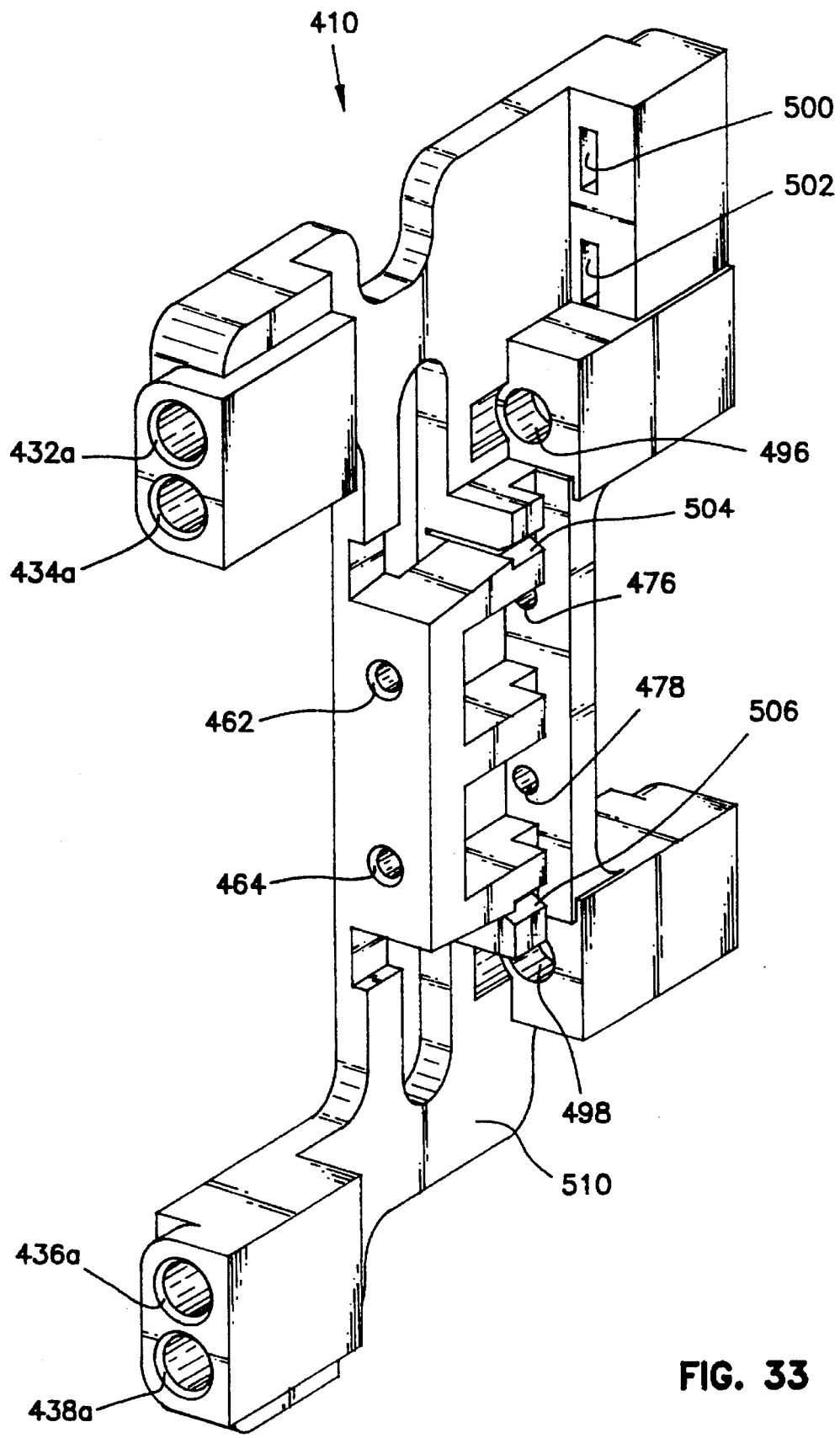
FIG. 33 is an enlarged perspective view of a dielectric support for the rear interface of FIG. 31.

Pins 414,416 are received within holes 462,464, respectively, formed in dielectric insert 410 (see FIG. 33). Pin 414 is shown enlarged in FIG. 38. Since pin 414 is identical to pin 416, a description of one will suffice as a description of the other.

Figure 38:
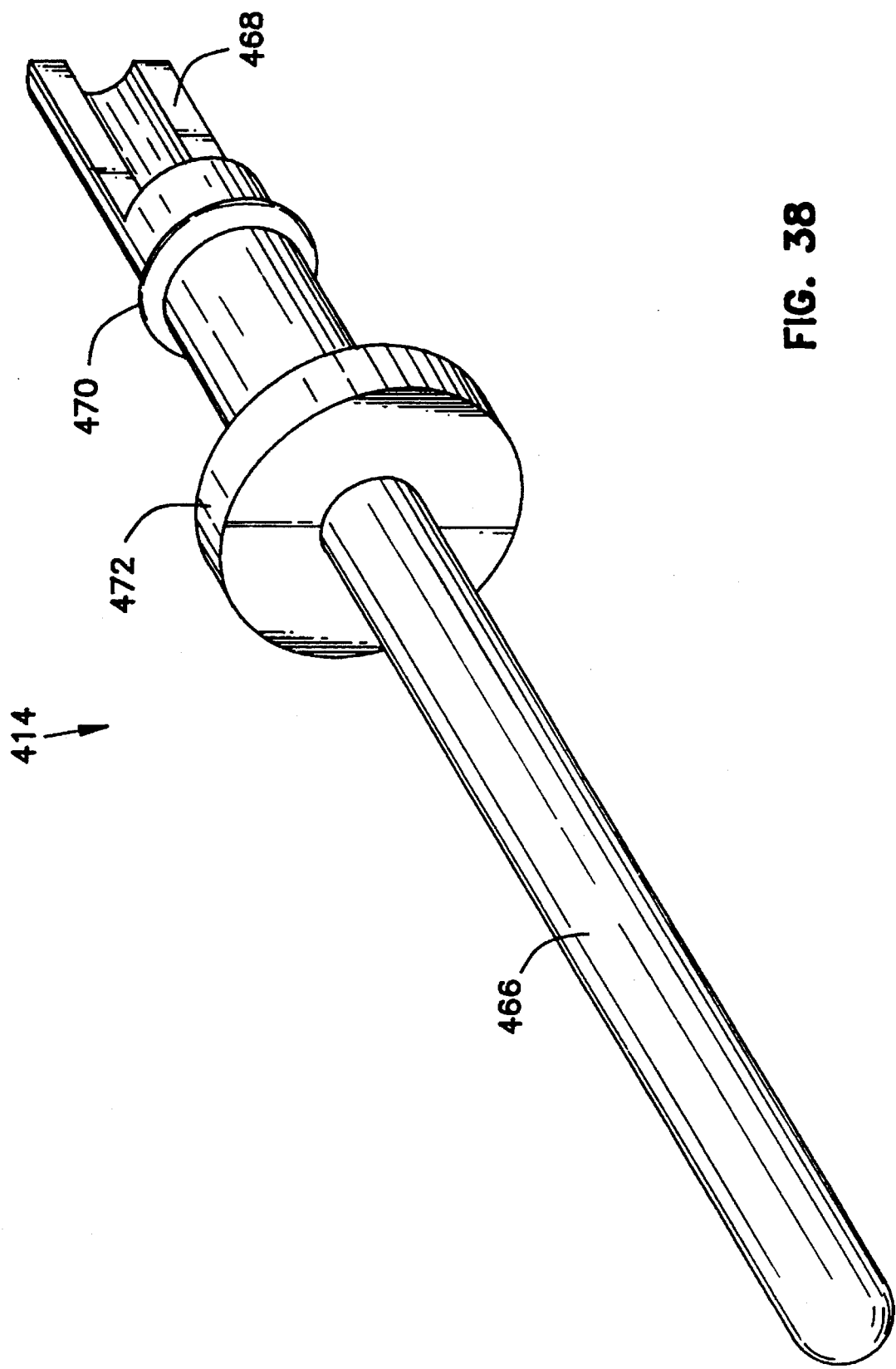
FIG. 38 is a pin conductor for use with the rear interface of FIG. 31.

With reference to FIG. 38, the pin 414 includes an elongated pin contact 466. On an opposite end of pin 414, a cutout 468 is provided. Cutout 468 permits reception of a conductor which may be soldered into cutout 468 in a manner previously described with respect to the conductors of jack module 10. A first annular rib 470 is provided adjacent cutout 468. Between rib 470 and pin end 466, an annular ring 472 is provided. Pin 414 is inserted into hole 462 with the ring 472 providing accurate placement and with rib 470 press fit into hole 462 to securely hold pin 414 in place. Pins 414 and 416 are disposed and sized to be received within conductors 44,45 of jack module 10 when sleeves 50,51 are received within ports 458,460. Accordingly, pins 414,416 become electrically connected to conductors 44,45.

The pin receiving conductors 418,420 are received within the bores 476,478 of insert 410 (see FIG. 33). Pin receiving conductor 418 is shown enlarged in FIG. 37. It will be appreciated that pin 418 is identical to pin 420 and a description of one will suffice as a description of the other.

The pin receiving conductor 418 (shown separately in FIG. 37) is generally cylindrical and hollow and includes a tapered pin receiving end 482. Opposite end 482, a cutout 484 is provided to permit placement of a conductor which may be soldered into cutout 484 in a manner previously described. Rib 486 is disposed adjacent cutout 484. Spaced from rib 486 on a side opposite of cutout 484 is an annular ring 488. Rib 486 and ring 488 serve the similar function as rib 470 and ring 472 of pin conductor 414. With the pin receiving conductors 418 received within holes 476,478, inductors 477,479 (see FIG. 32) are placed spanning and electrically connecting pin 414, pin receiving conductor 418, and pin 416 and pin receiving conductor 420 respectively. Conductors 418,420 are coaxially disposed within second OUT port 459 and second IN port 461, respectively.

Figure 36:
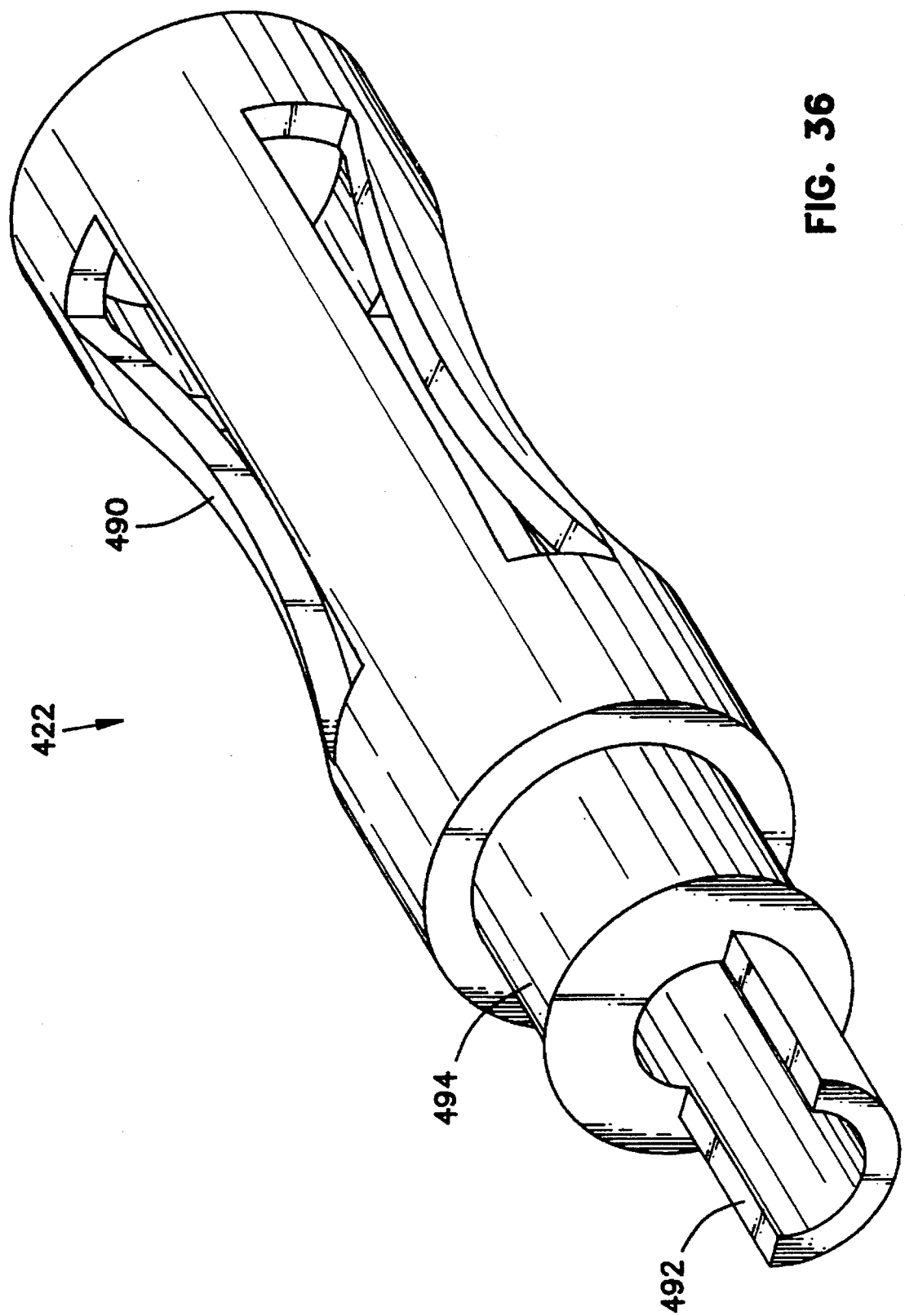
FIG. 36 is a perspective view of a pin receiving conductor for use with the rear interface of FIG. 31.
Figure 37:
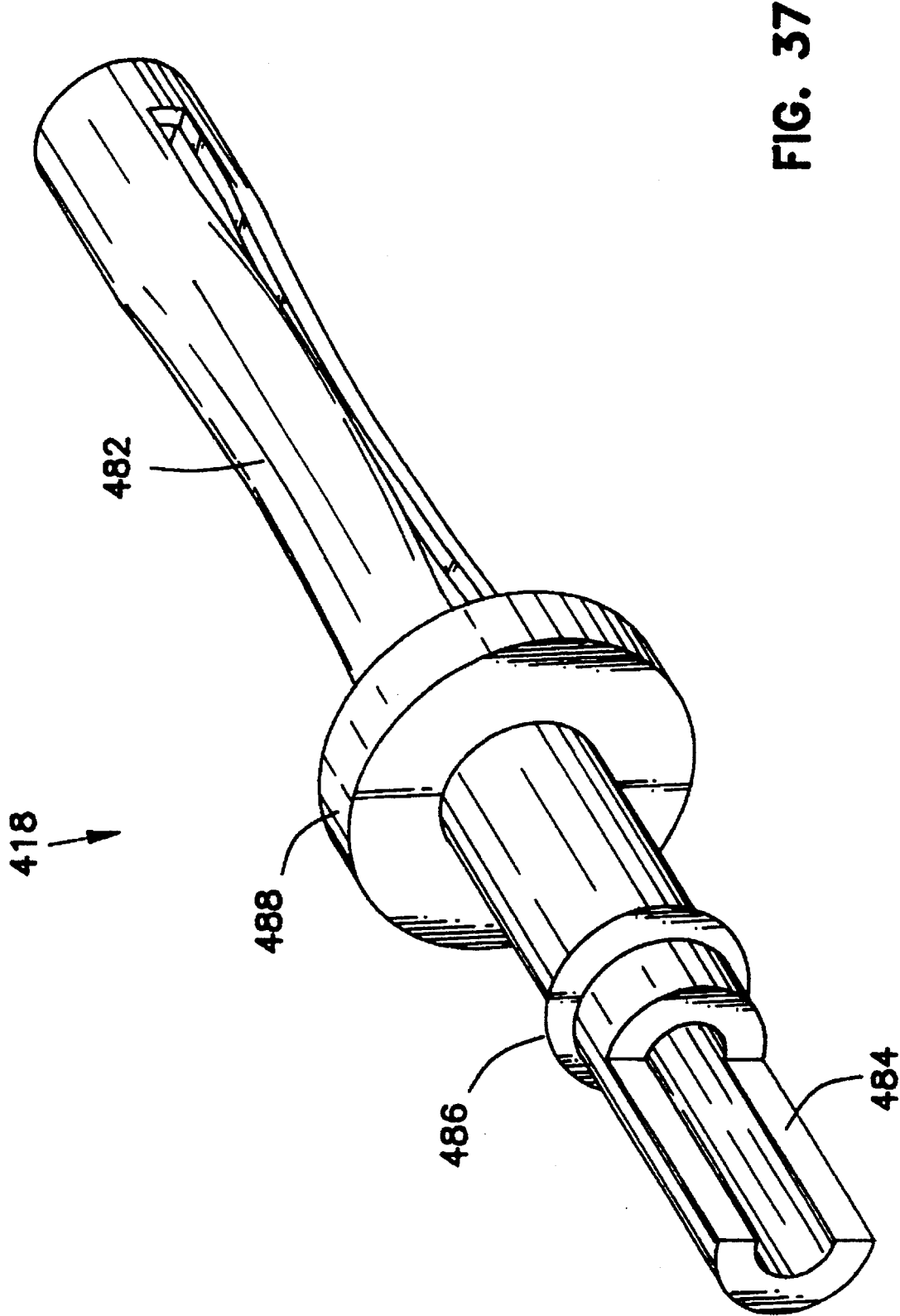
FIG. 37 is a perspective view of a pin receiving conductor for use with the rear interface of FIG. 31.

A pin receiving conductor 422 is shown enlarged in FIG. 36. Pin receiving conductor 422 is generally cylindrical and includes an inwardly-tapered plug receiving end 490. Pin receiving end is sized to receive a pin (not shown) of any standard plug which may be inserted within end 490. An opposite end of pin receiving conductor 422 includes a cutout 492 which receives a conductor which is soldered within cutout 492. A sleeve 494 is provided to permit press fitting of conductor 422 into a bore 496 (shown in FIG. 33) of insert 410. Similarly, pin receiving conductor 424 is received within bore 498 of dielectric insert 410.

Wire wrap pins 440,442 are identical. Shown in FIG. 39, pin 440 includes wire wrap end 440a and fastening barb 440b. The barb 440b, is received within slot 500 (see FIG. 32) formed in dielectric insert 410. Similarly, pin 442 is received within slot 502.

Figure 32:
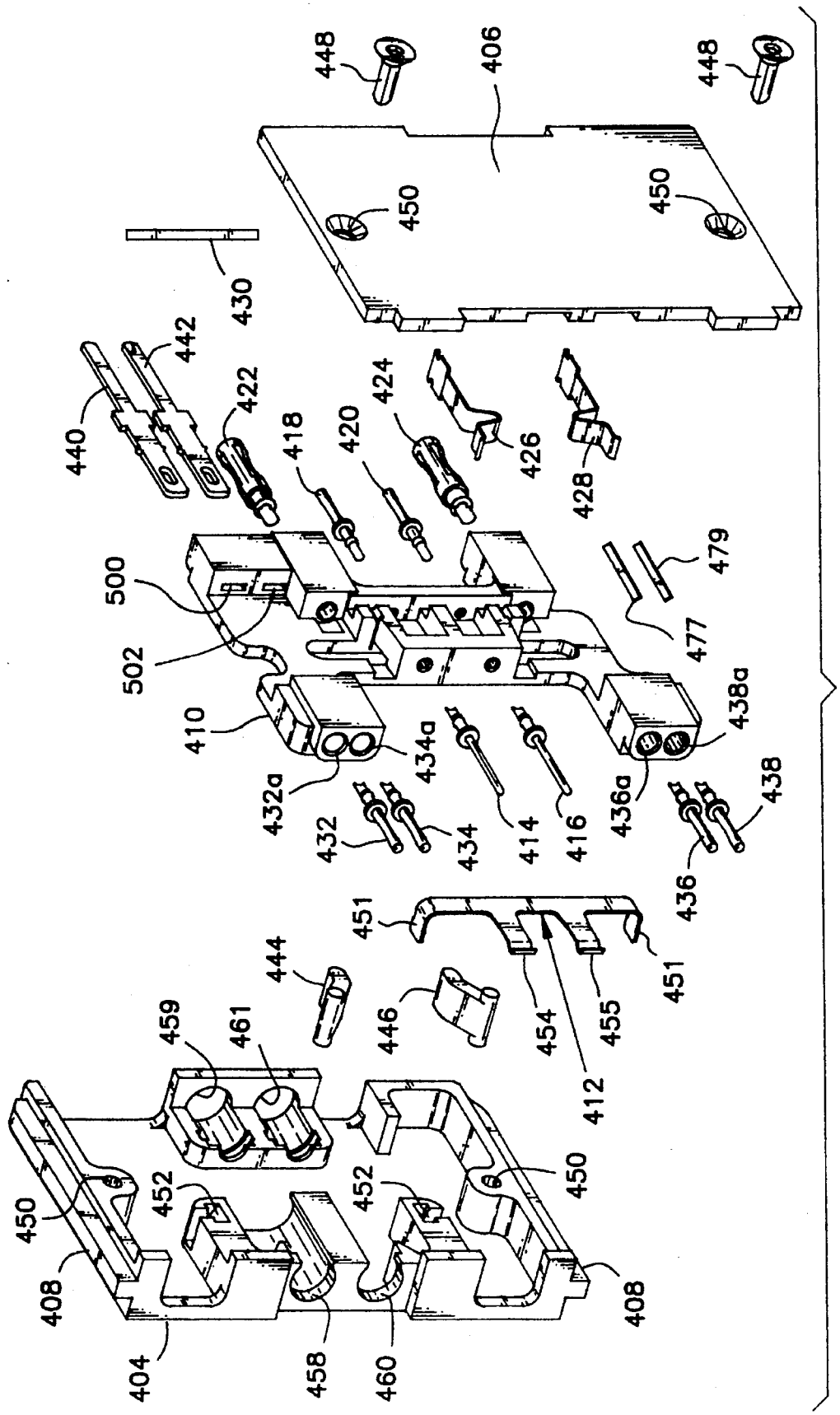
FIG. 32 is an exploded perspective view of the rear interface of FIG. 31.

The ground pin receiving conductors 432, 434, 436, and 438 are identical in construction to conductors 418,420 (conductor 418 being separately shown in FIG. 37) and are press fit into bores 432a, 434a, 436a, and 438a of dielectric insert 410 (see FIG. 32). Conductors 432,434 are disposed to receive pins 52,53 when sleeves 50,51 (see FIG. 30) are received within bores 458,460, respectively. Pin receiving conductors 436,438 are disposed to receive pins 53,52 when jack module 10 is rotated 180° with sleeve 50 received within bore 460 and with sleeve 51 received within bore 458. Symmetrical positioning of pin receiving conductors 432, 434,436, and 438 about a central axis X—X of rear interface 400 permits jack module 10 to be inserted in one of two orientations to permit monitoring of either the IN or the OUT conductors at the option of a user. FIG. 1 illustrates a rear interface 400 coupled to a jack module 10.

Figure 31A:
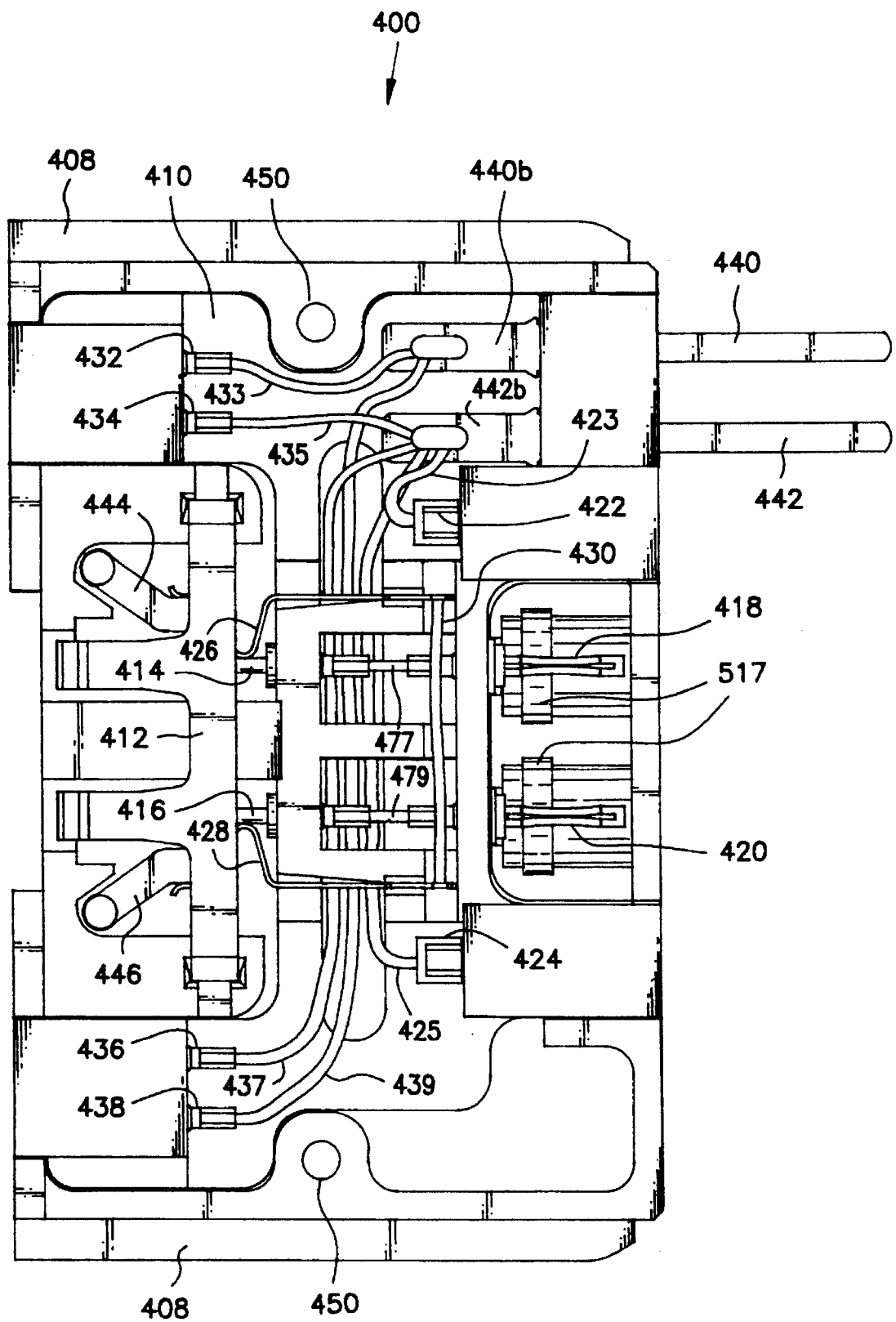
FIG. 31A is a side elevation view of the rear interface with a cover removed to exposed interior elements.

As shown in FIG. 31A, conductor 433,439 electrically connect the pin receiving conductor 432,438, respectively, with the wire wrap pin 440. Conductors 435,437, connect the pin receiving conductors 434,436, respectively, with wire wrap pin 442. Also, plug receiving conductors 422,424 are connected to pin 442 via conductors 423,425.

Referring to FIG. 31A, 32, 33 and 38 OUT spring 426 is received within a slot 504 in dielectric insert 410 (see FIG. 36). IN spring 428 is similarly received within a slot 506. The springs 426,428 are sized and positioned to be biased against pin conductors 414,416, respectively. Cam 444 is pivotably positioned to be urged by a sleeve (such as sleeve 50 or 51) received within bore 458 to urge spring 426 away from pin conductor 414 and thereby break electrical connection between spring 426 and pin conductor 414. Similarly, cam 446 is pivotably positioned to be urged by a sleeve (such as either sleeve 50 or 51) received within bore 460 to urge spring 428 away from and out of electrical connection with pin 416. The connecting conductor 430 electrically connects springs 426,428.

As shown best in FIG. 33, the dielectric insert 410 includes a generally flat bottom platform 510. Bottom platform 510 is sized to be received within and rest against an outer wall 512 (see FIG. 35) of main body 404. With the dielectric insert 410 received within body 404, the components are properly aligned with pins 414,416 centrally received within bores 458,460 (see FIG. 32). Grounding spring ends 454,455 are disposed within bores 458,460 to electrically engage a sleeve (such as sleeves 50,51) received within bores 458,460. Pin receiving conductors 432, 434, 436,438 are properly disposed to receive pins 52,53 depending on the orientation of the jack module 10 as previously described.

Figure 34:
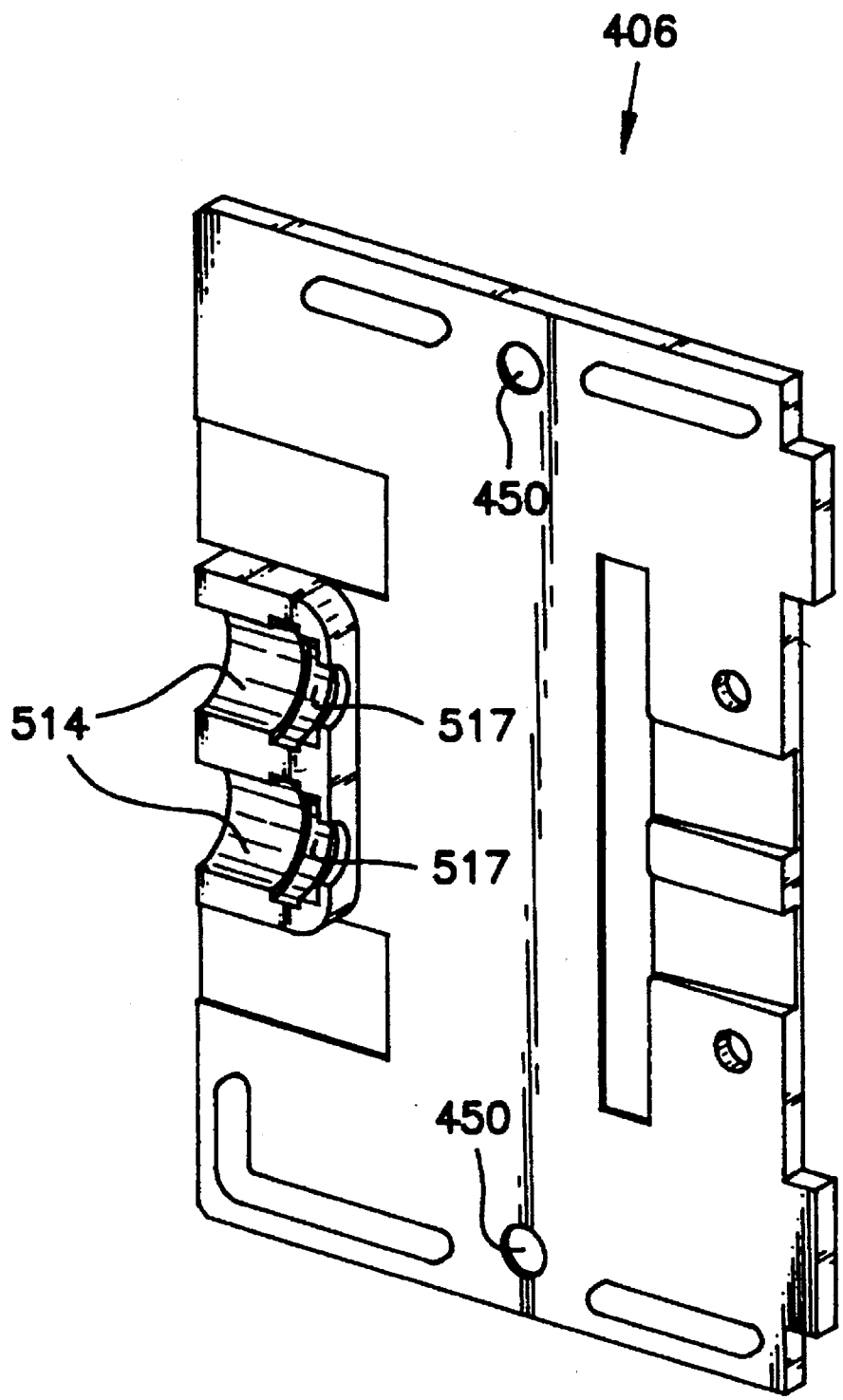
FIG. 34 is an inside perspective view of a cover for the rear interface of FIG. 31.
Figure 35:
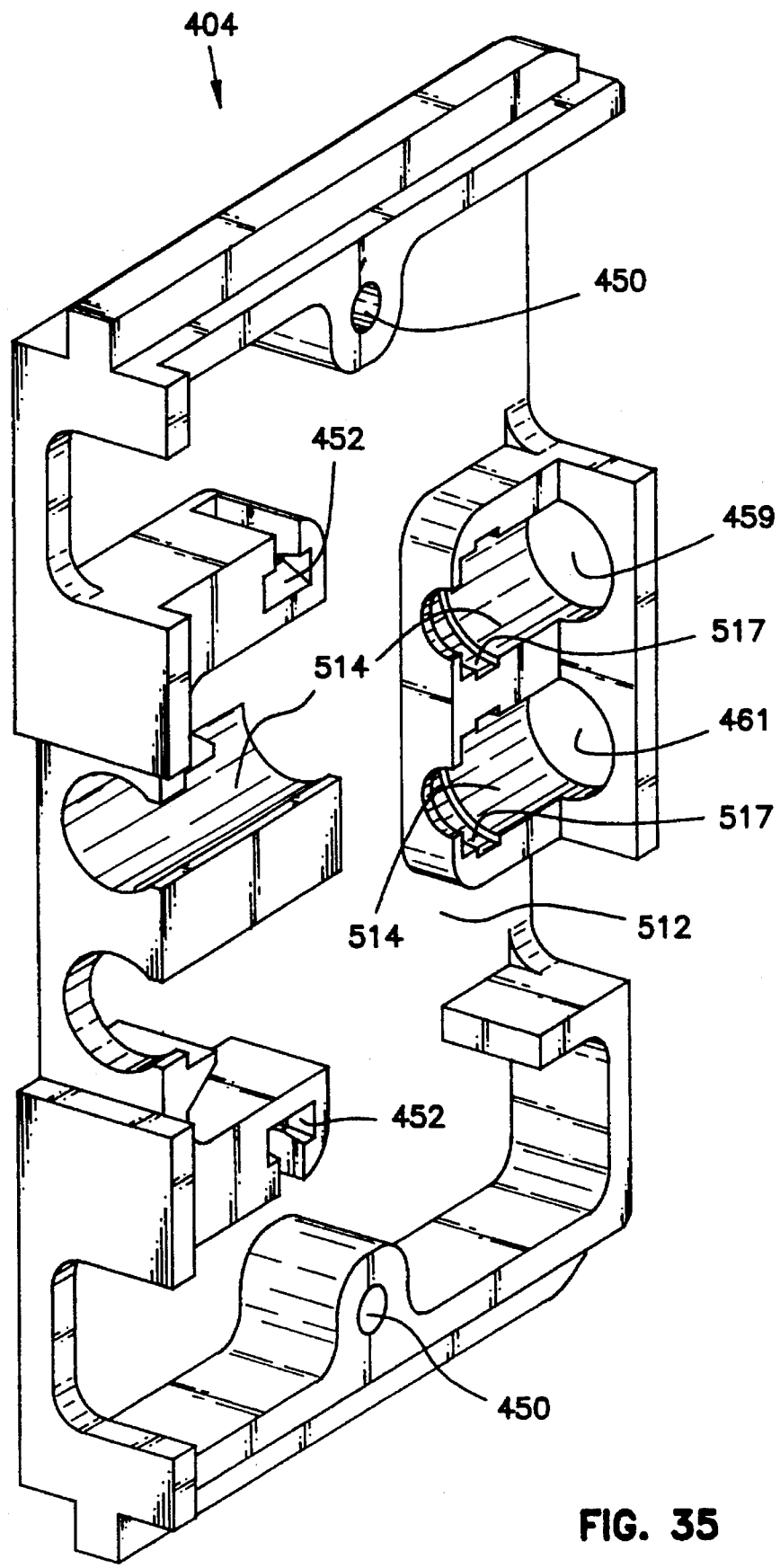
FIG. 35 is a perspective interior view of a housing body for the rear interface of FIG. 31.

As shown best in FIGS. 35 and 34, the body 404 and cover 406 are provided with a plurality of arcuate surfaces 514. The arcuate surfaces 514 are disposed to at least partially surround coax conductors 418, 420, 414, and 416. More accurately, the conductors 414, 416, 418 and 420 become central conductors surrounded by the grounded shields of the arcuate surfaces 514. As with the jack module 10, the rear interface 400 utilizes the geometry of the zinc body 404 and cover 406 to provide the grounded shield for the coax conductors.

As was the case with the jack module 10, the presence of springs 426,428 in generally parallel alignment to pin conductors 414,416, can result in an imbalanced or undesired impedance for the rear interface 400. Namely, as a result of the parallel geometry, a third capacitance is generated between the spring 426 and pin conductor 414. A fourth capacitance is generated between spring 428 and pin conductor 416. The gauge of cross-conductor 430 is selected to balance these capacitances. Namely, the cross-conductor 430 acts as an inductor to balance the capacitances. The specific gauge is selected to balance the capacitance resulting from the spacial relation of the springs 426,428 and the conductors 414,416.

E. PATCH PLUG DETAIL

As is common in the telecommunications industry, signals are brought to cross-connect jacks through coaxial cables. FIGS. 41–44 illustrate a patch plug 520 for electrically connecting a coax cable (not shown) to the rear of interface 400 by connection to pin receiving conductors 418,420.

Figure 43:
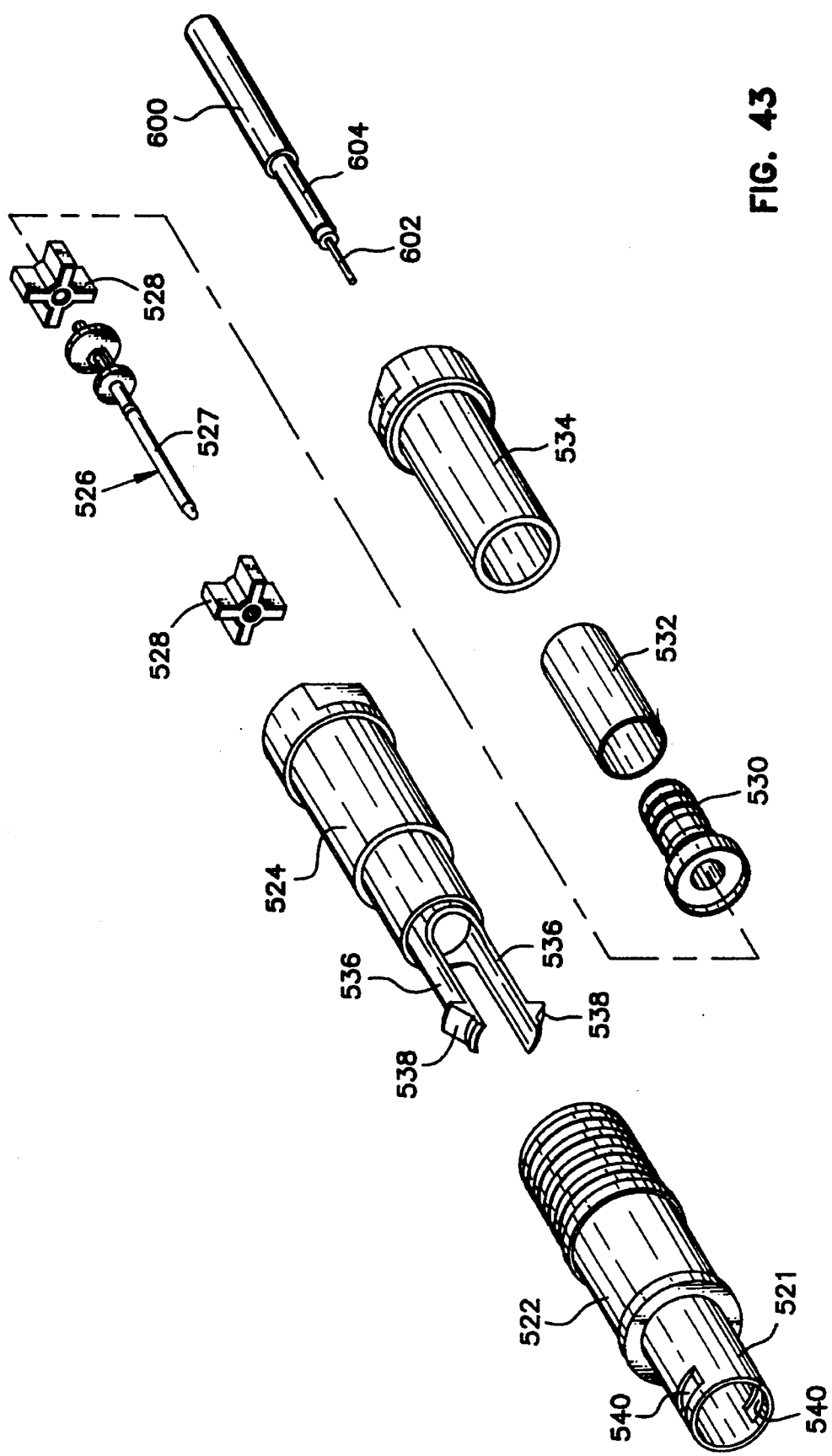
FIG. 43 is an exploded perspective view of the patch plug of FIG. 41.
Figure 44:
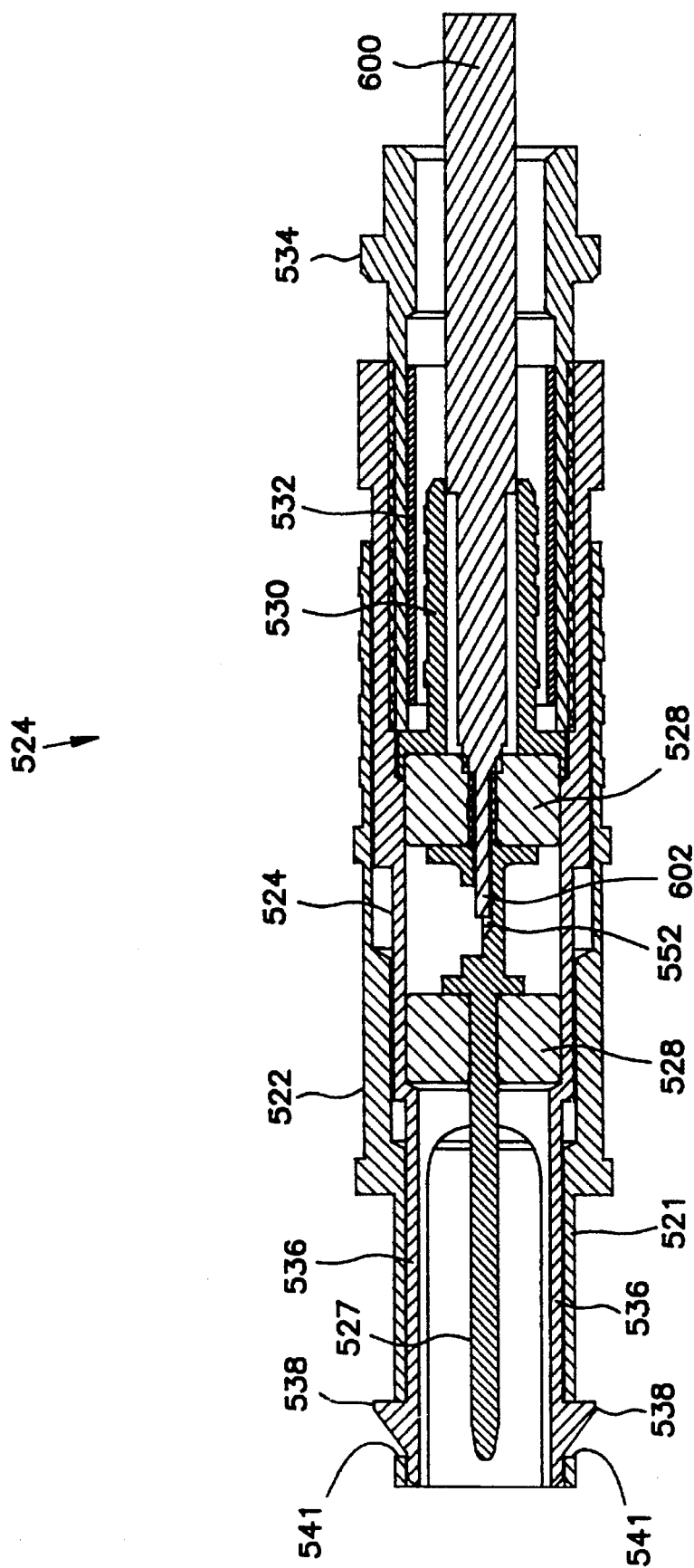
FIG. 44 is an assembled cross-sectional view of the patch plug of FIG. 41.

As shown in FIGS. 43 and 44, the patch plug 520 includes a generally cylindrical outer jacket 522. A barbed insert 524 is provided sized to be received within the interior of jacket 522. The elements of the patch plug further include a central coax conductor pin 526, dielectric spacers 528, first and second cooperating crimping members 530,532, and a rear retaining sleeve 534. A coax cable 600 with central conductor 602 and grounded sleeve 604 are connected to patch plug 520.

Shown best in FIGS. 43 and 44, barbed insert 524 is slidably received within outer jacket 522. The barbed insert has diametrically opposed arcuate and projecting barbs 536. Projecting outwardly from barbs 536 are protruding and angularly ramped locking tabs 538. Tabs 538 project through slots 540 formed in a reduced diameter portion 521 of outer jacket 522. Reduced diameter portion 521 is sized to be received within rear ports 459,461 (see FIG. 32) formed in housing body 404.

As shown in each of FIGS. 34 and 35, body 404 and housing cover 406 are provided with annular grooves 517. The locking tabs 538 (FIG. 43) are disposed to be received within grooves 517 (FIG. 35) to retain plug 520 from axial movement relative to the housing 404 while permitting rotational movement. With the plug 520 so received, the pin 527 (see FIGS. 43 and 44) of pin conductor 526 is disposed to be received within pin receiving conductors 418,420. The insulators 528 (see FIGS. 43 and 44) retain the pin 526 in concentric spaced relation to the conductive insert 524 and conductive outer jacket 522. The pin includes a conductor receiving bore 552 sized to receive a central conductor 602 of a commercially available coaxial cable.

The grounded shield of the coaxial cable 600 is placed between opposing surfaces of crimping members 530,532 after which outer crimping member 532 may be crimped against inner crimping member 530 to securely connect the grounding shield of the coaxial cable to the conductive outer jacket 520 in insert 524. The rear retaining sleeve 534 may be connected to the insulated sheeting of the coaxial cable with the rear retaining sleeve 534 connected to insert 524 by cooperating threads on the exterior of rear connecting sleeve 534 and the interior of insert 524.

The patch plug 520 is inserted into bores 514 by simply axially thrusting the plug 520 into bores 514 with pin 527 electrically and mechanically received within either of pin receiving conductors 418,420. Flexibility of the barbs 536 permits tabs 538 to flex inwardly to permit insertion. The tabs 538 then flex outwardly to be captured within annular grooves 517. To retract the plug, an operator simply pulls on outer jacket 522. A slot defining edge 541 (FIG. 44) on reduced diameter portion 521 urges against the ramp of tabs 538 to force the tabs 538 inwardly out of their locking position in grooves 517. This permits removal of the patch plug.

Since the outer jacket 520 is grounded by reason of connection to the ground shield of a coax cable, the body 404 and cover 406 are electrically grounded. Likewise, the housing 36 and cover 38 of module 10 are grounded.

F. OPERATION AND USE

With the structure thus described, the interface 400 is inserted within grooves 30 of chassis 12 to the rear portion of blocks 28,26. Coaxial cables (not shown) previously connected to patch plugs, such as plugs 520, are connected to the rear interface 400 by inserting an OUT coax cable into port 459 and an IN coax cable into port 461. In the absence of a module 10 connected to interface connector 400, the coaxial cables are electrically interconnected by reason of the electrical circuit from conductor 414, through springs 426,428 and conductor 430 to conductor 416 (FIG. 31A).

Upon insertion of a module 10 into rear interface connector 400, springs 426,428 are separated from conductors 414,416. With the module 10 oriented as in FIG. 1, conductor 42 is connected to conductor 414 and conductor 43 is connected to conductor 416. In the absence of a plug 14 in either of ports 81,82, conductors 42,43 are electrically connected via springs 54,56 and conductor 58. Insertion of a plug 14 into either of conductor ports 81,82 opens the electrical connection between conductors 42,43 by reason of separation of either of springs 54,56 from conductors 42,43.

Tracer lamp jacks are plugged into either sleeves 422,424. Power is provided by connection of voltage source and ground (not shown) to pins 440,442.

G. IMPEDANCE MATCHING

As previously mentioned, arcuate surfaces 152, 150, 514 formed on the interior of the jack module 10 and rear interface 400 provide shielded grounding surrounding central coax conductors upon connection of a grounded cable to interface 400. The surfaces cooperate with the conductors to provide proper impedance matching to achieve a desired 75 ohm impedance. Further, cross-conductor 58 and cross-conductor 430 are selected to have an inductance to tune the capacitive effect of springs 54, 56, 426, 428 aligned in parallel to the coax conductors. The precise surfaces and geometry of the surfaces and size of conductors 58,430 may be empirically selected. However, certain parameters for impedance matching are recognized in the art. To assist in a complete understanding of the present invention, a discussion of those follows.

1. Impedance

Impedance is defined as the total passive opposition offered to the flow of alternating current. For maximum power transfer to occur, the impedance of the source, the load, and the transmission cable and connectors must be the same. The greater the variation, the less efficient the transfer of energy becomes. As a pulse or wave travels down a transmission line, there is generally no problem as long as the impedance remains constant. However, when a section of different impedance is encountered, such as a poorly designed connector or distorted cable, a portion of the wave is reflected back toward the source resulting in a loss of power and/or distortion of the signal.

Figure 46:
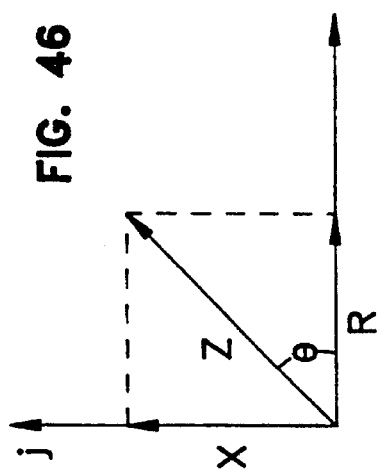
FIG. 46 is a schematic representation of impedance as a vector sum of resistance and reactance.

Impedance is a combination of resistance(R), inductive reactance($X_L$), and capacitive reactance($X_C$). It is the vector sum of resistance and reactance (R+jX), or the vector magnitude $Z=(R^2+X^2)^{1/2}$ at angle θ ($\tan^{-1}(X/R)$) where: $X=X_L-X_C$ (see FIG. 46).

Figure 47C:
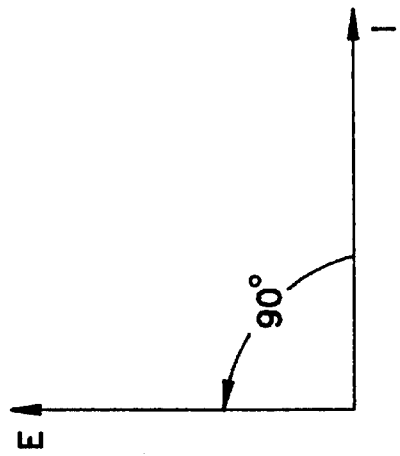
FIG. 47C is a schematic representation of a current and voltage lag.
Figure 47B:
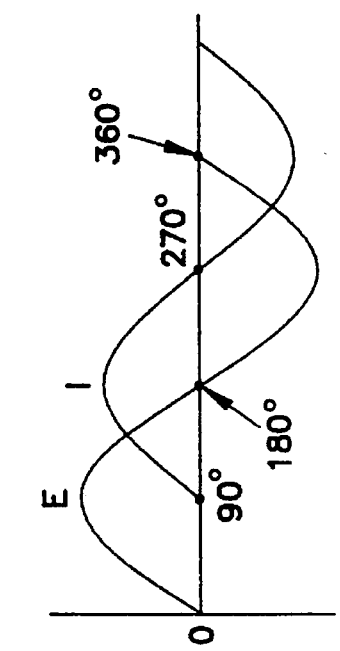
FIG. 47B is a schematic representation of voltage and current of the circuit of FIG. 47A.
Figure 47A:
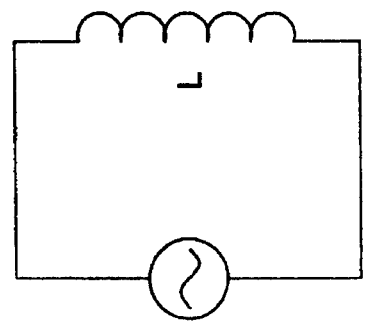
FIG. 47A is a schematic representation of a circuit with an inductor.

If there is only resistance in a circuit, the impedance (Z) is equal to the resistance (Z=R). The presence of an inductor in a circuit causes a counter electromotive force which, in addition to resistance, further opposes the flow of current. An inductor alone in a circuit (see FIG. 47A) causes the current I to lag the voltage E by a phase angle equal to 90° (see FIGS. 47B–47C). The impedance of the circuit is then greater than when it included resistance alone. The amount of increase in the impedance is equal to the inductive reactance. The inductive reactance is expressed as:

$$X_L=2\pi fL, \text{ ohms}$$

where:

f=frequency, hertz

L=inductance, Henry.

Figure 48C:
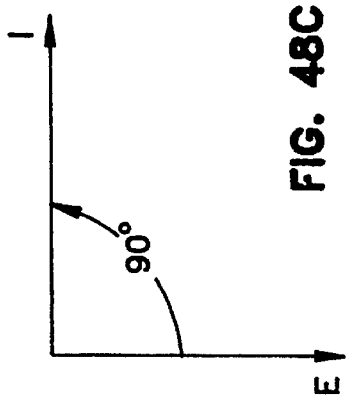
FIG. 48C illustrates the phase lag between the current and the voltage of the circuit of FIG. 48A.
Figure 48B:
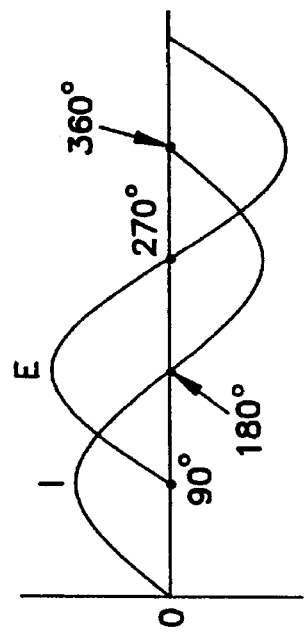
FIG. 48B is a voltage and current graph of the circuit of FIG. 48A.
Figure 48A:
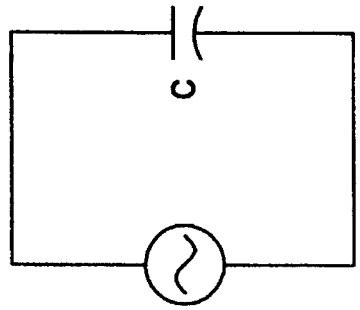
FIG. 48A is a schematic representation of a capacitance circuit.

The presence of a capacitor in a circuit also causes an electromotive force that opposes the flow of current I in a circuit. A capacitor alone in a circuit causes the voltage E to lag the current by a phase angle equal to 90° (see FIGS. 48A–48C). Like an inductor, a capacitor changes the impedance of a circuit, but unlike an inductor, a capacitor decreases the impedance of the circuit by an amount equal to the capacitive reactance. The capacitive reactance is expressed is:

$$X_C=1/(2\pi fC), \text{ ohms}$$

where:

f=frequency, hertz

C=capacitance, farad

There are three interrelated terms used to define impedance including: Return Loss, Voltage Standing Wave Ratio (VSWR), and the Reflection Coefficient (Refl Coeff). They are all concerned with how much of the incident (forward) wave is reflected back toward the source. If any one of these terms is known, the other two can be calculated, for example:

$$VSWR = \frac{1 + \text{Refl Coeff}}{1 - \text{Refl Coeff}}$$

$$\text{Refl Coeff} = \frac{VSWR - 1}{VSWR + 1}$$

Return Loss = 20 log (Refl Coeff)

Impedance measurement methods include return loss using a spectrum analyzer with a directional bridge, or a TDR ("time domain reflectometer") impedance profile using a time domain reflectometery. The spectrum analyzer will measure return loss in decibels over a selected frequency spectrum. The time domain reflectometer measures the impedance and displays a profile that indicates inductive and capacitive reactances. When considering impedance in connector design, the mechanical length and electrical length are congruent, and that if an impedance violation is less than 1% of ¼ wavelength of the operating frequency, there should generally be no impact on the performance of the transmission path or signal characteristics.

2. Inductive and Capacitive Tuning

Figure 49C:
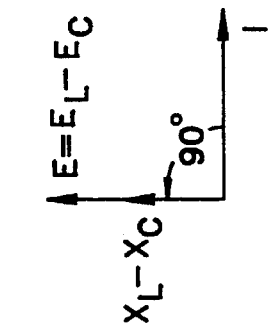
FIG. 49C illustrates a voltage and current lag.
Figure 49B:
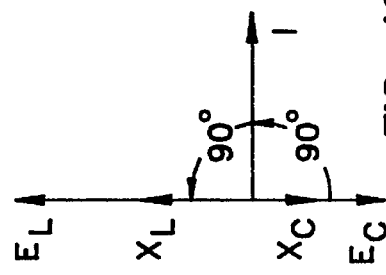
FIG. 49B illustrates a voltage and current lag.
Figure 49A:
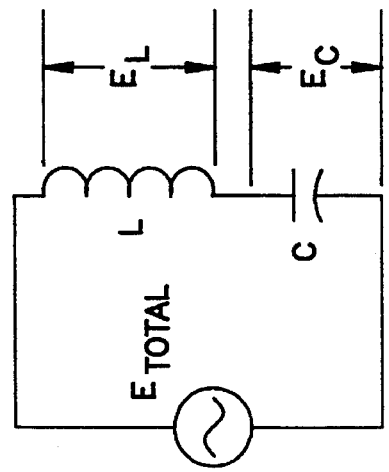
FIG. 49A is a schematic representation of a capacitor and an inductor in series in a circuit.
Figure 50C:
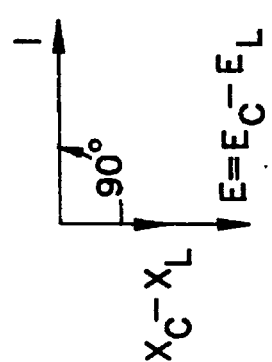
FIG. 50C is a diagram illustrating the phase relations of FIG. 50A.
Figure 50B:
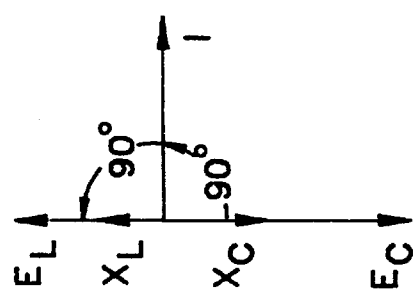
FIG. 50B is a diagram illustrating phase relations of a circuit of FIG. 50A.
Figure 50A:
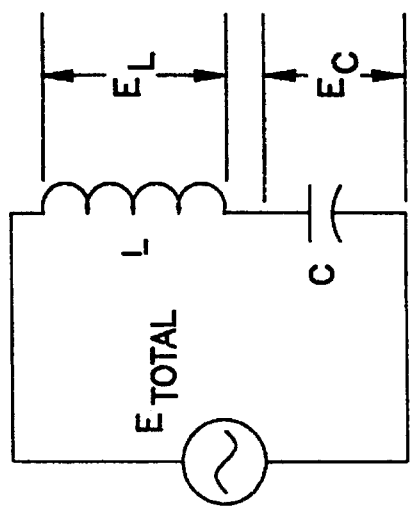
FIG. 50A is a schematic representation of a capacitor and an inductor in series.

When inductance and capacitance appear together in a circuit, a tuned circuit is formed. A series combination without the presence of a resistor is shown in FIGS. 49A–49C and 50A–50C. Since the voltage in an inductor leads the current by 90° and the voltage in a capacitor lags the current by 90°, the inductor and capacitor voltages are 180° out of phase with each other. Since the inductor and capacitor are connected in series, the current is the same through both circuit elements. Therefore, from Ohm's Law relationships ($E_L=I^*X_L$ and $E_C=I^*X_C$), the inductive and capacitive reactances are also 180° out of phase. The total voltage and total impedance ($Z=X_L-X_C$) for the circuit can be found by vectorially adding the inductive and capacitive components of voltage and reactance, respectively. Overall, the circuit in FIG. 49A is inductive ($E_L$ and $X_L$ predominant), and the circuit in FIG. 50A is capacitive ($E_C$ and $X_C$ predominant). It is important to note that the capacitance reduces the overall impedance and inductance increases the overall impedance as illustrated in the figures shown.

Tuning refers to the variation of the capacitance or inductance, thus a variation in the capacitive or inductive reactance, in order to achieve a desired overall impedance and phase angle.

3. Equations for Characteristic Impedance

The equations that follow are known in the art and have been developed for several transmission line geometries. These equations represent the characteristic impedance of a coaxial transmission line; and are suitable for connector design as well. Characteristic impedance of other geometries and offsets follow by theory similar to those described below.

Dielectric material is the insulating material which will store but not conduct electricity. A dielectric material's ability to store electrostatic energy, compared to this same storing ability for air is defined as the materials's dielectric constant. The dielectric constant for air is one.

a. Circular Cross-Section

Figure 51:
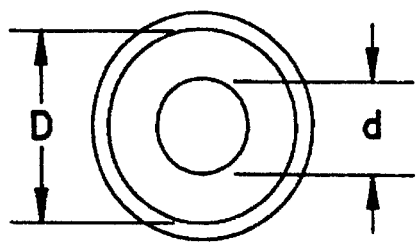
FIG. 51 is a schematic representation of a coaxial line in a circular outer conductor.

The characteristic impedance of a coaxial line in a circular outer conductor (see FIG. 51) is expressed as:

$$Z_o = \frac{138}{\sqrt{\epsilon}} \log\left[\frac{D}{d}\right]$$

where:
$Z_o$=characteristic impedance, ohms
D=inside diameter of outer conductor, inches
d=outside diameter of inner conductor, inches
$\epsilon$=dielectric constant of the insulating material.

b. Square Cross-Section

Figure 52:
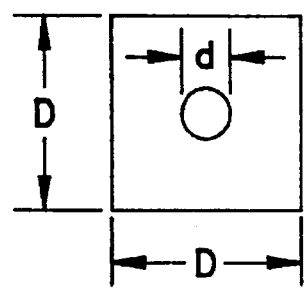
FIG. 52 is a schematic representation of a square outer conductor containing a coaxial line.

The characteristic impedance for a square outer conductor (see FIG. 52) containing a coaxial line through its center is expressed as:

$$Z_o = \frac{138}{\sqrt{\epsilon}} \log(p) + 6.48 - 2.34A - 0.48B - 0.12C$$

where:

$$A = \frac{1 + .405p^{-4}}{1 - .405p^{-4}}$$

$$B = \frac{1 + .163p^{-8}}{1 - .163p^{-8}}$$

$$C = \frac{1 + .067p^{-12}}{1 - .067p^{-12}}$$

c. Circular Cross-Section with Eccentric Center

Figure 53:
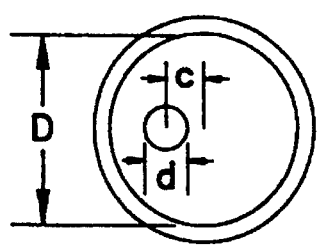
FIG. 53 is a schematic representation of a coaxial line positioned offset from the center of a circular outer conductor.

The characteristic impedance for a coaxial line located at an offset from the center (eccentric centerline) of a circular outer conductor (see FIG. 53) is expressed as:

$$Z_o = \frac{138}{\sqrt{\epsilon}} \log\left[\frac{D}{d}\right](1 - (2C/D)^2)$$

where:
C=radial offset of center conductor, inches.

d. Partially Dielectric Filled Cavity

If the dielectric-filled cavity is only partially filled with dielectric material, the factor $1/\sqrt{\epsilon}$ in the general equations above becomes:

$$1/\sqrt{(1 + (\epsilon - 1)r)}$$

where:
r=dielectric filled area/total area, inches².

e. Slotted Coaxial Line

Figure 54:
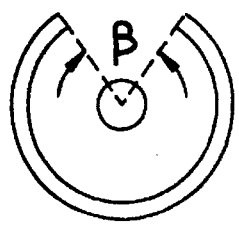
FIG. 54 is a schematic representation of a central coaxial line within a circular conductor with a slot introduced into the coaxial line.

When a slot (see FIG. 54) is introduced into a coaxial line, the increase in characteristic impedance $\delta Z$ compared to a normal circular coaxial line (see FIG. 51) is less than:

$$\delta Z = 0.03 \beta^2$$

where:
$\beta$=the slot angle in radians that is filled with air.

f. Rectangular Cross-Section

Figure 55:
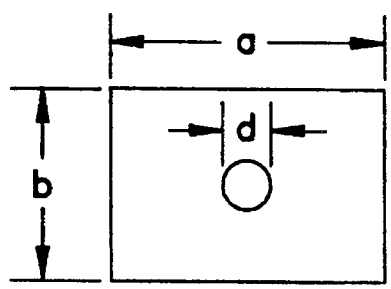
FIG. 55 is a schematic representation of a rectangular outer conductor containing a coaxial line through its center.

The characteristic impedance for a rectangular outer conductor (see FIG. 55) containing a coaxial line through its center with a partially dielectric-filled cavity is expressed as:

$$Z_0 = \frac{138}{\sqrt{1 + (\epsilon - 1)r}} \log\left[\frac{8\left[\frac{b}{2}\right]}{\pi d} \exp\left[\frac{-4}{\exp\left[\pi \frac{a}{b} + 1\right]}\right]\right]$$

where:
$Z_0$=characteristic impedance, ohms.
$\epsilon$=dielectric constant of the insulating material
r=dielectric filled area/total area, inches²
b=height of cross-sectional area, inches
a=width of cross-sectional area, inches
d=diameter of inner conductor This equation may be further modified to compensate for an eccentric or doubly eccentric centerline.

g. Use of Equations The foregoing equations may be combined to mathematically compute the inductance for the module 10 and rear interface 400. For example, with reference to FIGS. 11–15, the reader will note the central conductors 41, 42, 43 pass through outer conductors (i.e., the opposing surfaces of housing 36 and cover 38) which have a varying geometry. Also, the space between the conductors 41, 42, and 43 and their surrounding conductive surfaces are partially filled with dielectric material (e.g., blocks 200,200a). Applying the foregoing equations to each geometric segment permits modifying the geometries until a desired impedance is attained. Actual geometries may be further modified in response to a measured impedance until a final geometry is obtained which yields a desired impedance.

4. Cantilever Springs

Figure 56:
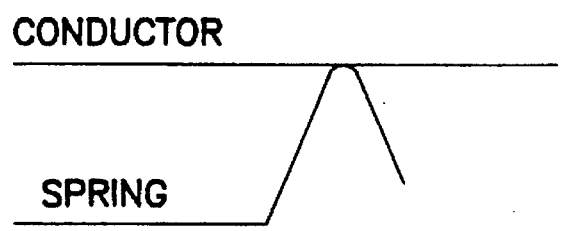
FIG. 56 is a schematic representation of a cantilever spring and conductor running parallel to one another.

A capacitor consists of two parallel conductors separated by a dielectric. Each cantilever spring and conductor running parallel to it act as capacitors with point contacts on one end (see FIG. 56).

The two capacitors are electrically in series with a cross-conductor having an inductance that can be varied for balance and tuning. This circuit can be tuned for impedance matching between the 75Ω line and the module conductors which would minimize phase distortion and other losses in the circuit. Additional inductance can be added in series with the above components, and then varied for tuning purposes. Varying the inductance means varying the inductive reactance ($X_L=2\pi fL$). Since impedance is dependent upon inductive reactance ($Z=R+(X_L-X_C)$), increasing or decreasing the inductance appropriately can achieve balance in the reactance terms. The ideal case is choosing a value of inductance that would cause the inductive reactance to equal the capacitive reactance at a given frequency. Under this condition, phase distortion and losses would be at a minimum.

The reader will note the schematic of FIG. 45 represents the geometry of springs 54, 56, 426, 428 opposing conductors 42, 43 (with inductors 46, 47), 414 and 416 (with inductors 477, 479). FIG. 45 also shows other elements earlier described (for example, conductors 433, 439 shown in FIG. 31A) to illustrate in schematic format the circuit of interface 400. Utilizing the foregoing equations, the necessary inductance of conductors 58,430 can be calculated. The final gauge and inductance of conductors 58,430 may be further modified in response to a measured impedance until a final desired impedance is attained.

H. SUMMARY

From the foregoing, the reader will appreciate that the size of DSX modules can be greatly reduced by the teachings of the present invention. So reduced, a higher density of DSX modules may be installed in a given system. Further, individual modules 10 may be paired in a common circuit to provide multiple position porting on the forward end.

The jack module 10 does not, by itself, comprise a complete DSX circuit. Instead, the jack module may be paired with an additional jack module to form a completed circuit. Further, the utilization of the normally closed rear interface circuit permits the use of the module in a digital distribution function such as that shown and described in commonly assigned and copending U.S. patent application Ser. No. 07/614,143 filed Nov. 15, 1990, now U.S. Pat. No. 5,199,878, issued Apr. 6, 1993, and entitled "Digital Distribution Apparatus."

While the foregoing has been a description of the preferred embodiment of the present invention, it will be appreciated by those skilled in the art that equivalents and modifications may be apparent in light of the present teachings. It is intended that such modifications and equivalents be included within the scope of the present claims which are attached or may be appended hereto.

What is claimed is:

1. A coax jack module comprising:

a first coax conductor;

a second coax conductor;

a first resilient conductive contact biased into electrical contact with said first conductor, said first conductor and said first contact having a combined first capacitance;

a second resilient conductive contact biased into electrical contact with said second conductor, said second conductor and said second contact having a combined second capacitance;

a cross-conductor electrically connecting said first and second contacts;

said cross-conductor having an inductance balancing said first and second capacitance;

an electrically conductive housing having a cast unitary body with walls defining an interior and a cover for enclosing said interior;

a dielectric support means for supporting said conductors, said contacts and said cross-conductor within said interior;

said body and cover having interior surfaces of a predetermined shape to provide a grounded shield for said conductors; and said body and cover having generally parallel and narrowly spaced apart exterior surfaces.

2. A coax jack module comprising:

a grounded electrically conductive housing having at least a partially enclosed interior;

an electrical circuit contained within said housing and including a plurality of coax conductors;

said circuit further including a plurality of cross-connect spring contacts;

a dielectric support platform disposed within said interior and having means for connecting said spring contacts and said conductors to said support platform in an electrically insulated spacing arrangement from said housing, said support platform further supporting said conductors and spring contacts in mutual alignment;

said housing having interior surfaces at least partially surrounding said conductors with said surfaces having a predetermined shape to provide a coax shielding for said circuit to have a desired impedance.

3. A coax jack module according to claim 2 wherein said support means includes a dielectric insert of a predetermined size so as to be disposed within said interior and having means for securing said springs to said insert and means for securing said conductors to said insert.

4. A coax jack module according to claim 3, wherein said spring contacts include at least first and second spring contacts spaced in generally parallel relation to said conductors and cooperating with said conductors to generate a capacitance therebetween; a cross-conductor electrically connecting said at least first and second contacts with said cross-conductor having a preselected inductance such that said inductance of said cross-conductor balances said circuit including said capacitance.

5. A coax jack module according to claim 2, wherein said conductors include forward and rear conductor portions connected by an inductive element.

6. A coax jack module according to claim 2 wherein said support means includes conductor supports having a preselected geometry selected for said module to have a desired impedance.

7. A coax jack module according to claim 2 comprising said housing having a forward wall, a plurality of ports through said forward wall and of a predetermined size so as to receive a jack plug; a plurality of cams disposed within said housing to be urged by a plug inserted within a port to urge at least one of said spring contacts away from said conductor.

8. A coax jack module according to claim 7 comprising an electrically conductive grounding spring disposed within said interior to engage a plug inserted within a port, said grounding spring electrically connected to said housing.

9. A coax jack module comprising:

a grounded electrically conductive housing having at least a partially enclosed interior;

a plurality of coax conductors;

a plurality of cross-connect spring jacks;

support means for supporting said jacks and said conductors within said interior in an insulated spacing arrangement from said housing and with said jacks and conductors cooperating to define a circuit;

said housing having interior surfaces at least partially surrounding said conductors with said surfaces of a predetermined shape to provide a coax shielding for said conductors for said circuit to have a desired impedance;

said housing including a body portion and a cover connected to said body portion having interior concave surfaces and said cover having interior concave surfaces, said cover and body surfaces disposed for said surfaces to cooperate to define a grounded shield.

10. A coax jack module comprising:

an electrically conductive housing having a cast body with walls defining an interior and a cover of a predetermined size to enclose said interior;

a first central coax conductor;

a second central coax conductor;

support means for supporting said first and second central coax conductors within said interior;

said housing having a forward wall with at least a first port extending therethrough and said first port being of a predetermined size to receive a jack plug having a central conductor, said first central coax conductor positioned to connect with said central conductor of said jack plug;

a first electrically conductive normal spring contact disposed within said housing and biased into electrical contact with said first central coax conductor;

a second electrically conductive contact disposed within said housing in electrical contact with said second central coax conductor;

first urging means for urging said first normal spring contact away from said first central coax conductor in response to insertion of a jack plug into said first port;

a cross-conductor electrically connecting said first and second contacts with a circuit including said cross-conductor, said first and second contacts, and said first and second central coax conductors, said circuit having a predetermined impedance; and said cover and body presenting generally parallel and narrowly spaced apart exterior surfaces.

11. A coax jack module according to claim 10 further comprising a plurality of grounded, electrically conductive surfaces surrounding said first and second central coax conductors with said electrically conductive surfaces having predetermined dimensions which provide for said jack module to have a desired impedance.

12. A coax jack module according to claim 11 wherein said housing is electrically conductive and said electrically conductive surfaces are integrally disposed on said internal surfaces.

13. A coax jack module according to claim 12 wherein said support means is a dielectric support disposed within said interior.

14. A coax jack module according to claim 13 wherein said first and second contacts are carried on said dielectric support.

15. A coax jack module according to claim 11 further comprising a third central coax conductor supported within said interior by said support means;

said plurality of electrically conductive surfaces including surfaces surrounding said third central coax conductor;

a third port in said forward wall of a predetermined size so as to receive a further jack plug with a central conductor of said further jack plug electrically connected to said third central coax conductor; and means for electrically connecting said third central coax conductor across a resistive circuit to a selected one of said first and second central coax conductors.

16. A coax jack module according to claim 10 further comprising a second port extending through said forward wall and of a predetermined size and position for said central conductor of said jack plug to connect with said second central coax conductor;

said second contact is a second normal spring contact biased into electrical with said second central coax conductor; and second urging means for urging said second normal spring contact away from said second central coax conductor in response to insertion of a jack plug into said second port.

17. A coax jack module according to claim 16 further comprising a first termination spring contact and a second termination spring contact and said first and second normal spring contacts movable between a first position with said first and second normal spring contacts biased into electrical contact with said first and second central coax conductors, respectively, and a second position with said first and second normal spring contacts displaced from said first and second central coax conductors by said first and second urging means, said first and second termination spring contacts positioned to electrically engage said first and second, respectively, normal spring contacts in said second position and disconnected therefrom in said first position.

18. A coax jack module according to claim 17 further comprising means for electrically connecting said first and second termination spring contacts to an electrical ground.

19. A coax jack module according to claim 16 wherein said jack plug includes a ground sleeve and wherein said module further comprises grounding means for electrically connecting with said ground sleeve at said first and second ports to an electrical ground.

20. A coax jack module according to claim 16 further comprising:

first and second connector elements extending from a rear end of said housing, said first and second connector elements including first and second rear central coax conductors, respectively, and first and second grounding sleeves surrounding said first and second rear central coax conductors, respectively;

said first rear central conductor connected to said first central conductor, and said second rear central conductor connected to said second central conductor.

21. A coax jack module according to claim 20 comprising first and second inductive components connecting said first and second rear and first and second central coax conductors, respectively.

22. A coax jack module comprising:

a housing having opposing internal surfaces defining a housing interior;

a first central coax conductor;

a second central coax conductor;

support means for supporting said first and second central coax conductors within said interior;

said housing having a forward wall with at least a first port extending therethrough and of a predetermined size for a jack plug to be inserted into said first port, with said jack plug having a central conductor electrically connected to said first central coax conductor;

a first electrically conductive normal spring contact disposed within said housing and biased into electrical contact with said first central coax conductor;

a second electrically conductive contact disposed within said housing and in electrical contact with said second central coax conductor;

first urging means for urging said first normal spring contact away from said first central coax conductor in response to insertion of a jack plug into said first port;

a cross-conductor electrically connecting said first and second contacts with a circuit including said cross-conductor, said first and second spring contacts, and first and second central coax conductors, said circuit having a predetermined impedance;

first and second connector elements extending from a rear end of said housing, said first and second connector elements including first and second rear central coax conductors, respectively, and first and second grounding sleeves surrounding said first and second rear central coax conductors, respectively;

said first rear central conductor connected to said first central conductor, and said second rear central conductor connected to said second central conductor;

a rear interface having a housing with opposing internal surfaces defining an interior;

a first interface central coax conductor;

a second interface central coax conductor;

support means for supporting said first and second interface central conductors within said interior in electrically insulated spacing from said internal surfaces;

said housing having a forward wall with first and second interface ports of a predetermined size and positioned to receive said first and second connector elements, respectively, of said jack module, with said first rear central conductor electrically connected to said first interface central conductor and with said second rear central conductor electrically connected to said second interface central conductor;

first and second rear contact springs disposed and biased to be in electrical connection with said first and second interface conductors, respectively;

first and second interface urging means for urging said first and second spring contacts away from said first and second interface conductors in response to insertion of said first and second connector elements into said first and second interface ports;

a rear cross-conductor for electrically connecting said first and second rear contact springs.

23. A coax jack module according to claim 22 wherein said cross-conductor has a predetermined inductance to balance a capacitance of said springs.

24. A coax jack module according to claim 22 wherein said interior surfaces of said rear interface housing are electrically conductive and electrically grounded and have a predetermined shape which provides for said rear interface to have a desired impedance.

25. A coax jack module according to claim 22 including cable connection means for connecting a coax cable to at least one of said first and second interface central coax conductors.

26. A coax jack module according to claim 25 wherein said cable connection means includes a plug secured to said coax cable and connection means for connecting said plug to said at least one of said first and second interface central coax conductors.

27. A coax jack module according to claim 26 wherein said plug includes means for locking said plug to said at least one of said first and second interface central coax conductors.

28. A coax jack module according to claim 27 wherein said plug includes a manually engageable jacket slidably connected to an insert having a longitudinal axis; a tab secured to said insert and biased radially away from said axis of said insert; means for urging said tab radially inwardly from axial movement of said jacket relative to said insert; said rear interface housing having a bore of a predetermined size to receive said jacket and said tab, said housing further having a detent of a predetermined size to receive said tab.

29. A coax jack module according to claim 28 wherein said jacket is electrically conductive, and is of a predetermined size so as to electrically engage said rear interface housing; means for electrically connecting said jacket to a ground shield of said coax cable.

30. A coax jack module comprising:

a housing having opposing internal surfaces defining a housing interior;

a first central coax conductor;

a second central coax conductor;

support means for supporting said first and second central coax conductors within said interior;

said housing having a forward wall with at least a first port extending therethrough and of a predetermined size for a jack plug to be inserted into said first port, said jack plug having a central conductor electrically connected to said first central coax conductor;

a first electrically conductive normal spring contact disposed within said housing and biased into electrical contact with said first central coax conductor;

a second electrically conductive contact disposed within said housing and in electrical contact with said second central coax conductor;

first urging means for urging said first normal spring contact away from said first central coax conductor in response to insertion of a jack plug into said first port;

a cross-conductor electrically connecting said first and second contacts with a circuit including said cross-conductor, said first and second contacts, and said first and second central coax conductors, said circuit having a predetermined impedance;

a plurality of electrically conductive surfaces surrounding said first and second central coax conductors with said electrically conductive surfaces having predetermined dimensions which provide for said jack module to have a desired impedance upon electrical connection of said electrically conductive surfaces to an electrical ground;

first and second tracer spring contacts disposed within said housing and biased into an electrical spacing between said first and second tracer spring contacts; and tracer urging means for urging said first and second spring contacts into electrical connection in response to insertion of a jack plug into a monitor port of the coax jack module.

31. A coax jack module comprising:

a housing having opposing internal surfaces defining a housing interior;

a first central coax conductor;

a second central coax conductor;

support means for supporting said first and second central coax conductors within said interior;

said housing having a forward wall with at least a first port extending therethrough and said port having a size such that a jack plug inserted into said first port has a central conductor of said jack plug electrically connected to said first central coax conductor;

a first electrically conductive normal spring contact disposed within said housing and biased into electrical contact with said first central coax conductor;

a second electrically conductive contact disposed within said housing and in electrical contact with said second central coax conductor;

first urging means for urging said first normal spring contact away from said first central coax conductor upon insertion of a jack plug into said first port;

a cross-conductor electrically connecting said first and second contacts with a circuit including said cross-conductor, said first and second spring contacts, and said first and second central coax conductors, said circuit having a predetermined impedance;

first and second connector elements extending from a rear end of said housing, said first and second connector elements including first and second rear central coax conductors, respectively, and first and second grounding sleeves surrounding said first and second rear central coax conductors, respectively;

said first rear central conductor connected to said first central conductor, and said second rear central conductor connected to said second central conductor;

said circuit including first and second inductors, said first and second rear central coax conductors are connected to said first and second coax conductors through said first and second inductors.

32. A coax jack module comprising:

a housing having opposing internal surfaces defining a housing interior;

a first central coax conductor;

a second central coax conductor;

support means for supporting said first and second central coax conductors within said interior;

said housing having a forward wall with at least a first port extending therethrough and of a predetermined size for a jack plug to be inserted into said first port, with said jack plug having a central conductor electrically connected to said first central coax conductor;

a first electrically conductive normal spring contact disposed within said housing and biased into electrical contact with said first central coax conductor;

a second electrically conductive contact disposed within said housing and in electrical contract with said second central coax conductor;

first urging means for urging said first normal spring contact away from said first central coax conductor in response to insertion of a jack plug into said first port;

a cross-conductor electrically connecting said first and second contacts;

a circuit including said cross-conductor, said first and second contacts, and said first and second central coax conductors, said circuit having a predetermined impedance;

said housing includes an electrically grounded body and an electrically grounded cover secured to said body, each of said body and cover comprised of electrically conductive material and each having said internal surfaces integrally disposed on said body and cover; at least one of said surfaces on said body opposing at least one of said surfaces on said cover with said at least one opposing surfaces cooperating to at least partially surrounded at least one of said first and second central coax conductors to provide a grounded coax shield for said least one conductor.

33. A coax jack module assembly comprising:

(a) a plurality of jack modules, each of said jack modules having:

a housing having opposing internal surfaces defining a housing interior;

a first central coax conductor;

a second central coax conductor;

support means for supporting said first and second central coax conductors within said interior;

said housing having a forward wall with at least a first port extending therethrough and of a predetermined size for a jack plug to be inserted into said first port, with said jack plug having a central conductor electrically connected to said first central coax conductor;

a first electrically conductive normal spring contact disposed within said housing and biased into electrical contact with said first central coax conductor;

a second electrically conductive contact disposed within said housing and in electrical contact with said second central coax conductor;

first urging means for urging said first normal spring contact away from said first central coax conductor upon insertion of a jack plug into said first port;

a cross-conductor electrically connecting said first and second contacts with a circuit including said cross-conductor, said first and second contacts, and said first and second central coax conductors, said circuit having a predetermined impedance;

each of said housings of said modules includes an electrically conductive body and an electrically conductive cover releasably securable to said body, each of said body and cover releasably securable to said body, each of said body and cover having said internal surfaces integrally disposed on said body and cover; at least one of said surfaces on said body opposing at least one of said surfaces on said cover with said at least one opposing surfaces cooperating to at least partially surrounded at least one of said first and second central coax conductors to provide a grounded coax shield for said least one conductor upon connection of said body and cover to an electrical grounds; and (b) a chassis to receive and retain a plurality of said modules in side-by-side electrically insulated spaced relation;

(c) said chassis and each of said modules including cooperating mounting means to separately mount said modules within said chassis with said modules disposed in side-by-side relation and with each of said modules electrically insulated from others of said modules within said chassis.

34. A coax jack module according to claim 33 wherein said chassis includes spaced apart first mating guide means, second mating guide means disposed on said housing, said first and second mating guide means cooperating to slidably mate and guide said module to a desired inserted position.

35. A coax jack module according to claim 34 wherein said housing includes first and second generally parallel spaced apart sidewalls extending between first and second edges, said second mating guide means disposed on at least one of said first and second edges for said sidewalls to be in generally parallel spaced apart relation to a sidewall of a contiguous module contained within said chassis.

36. A coax jack module comprising:

an electrically conductive housing having opposing internal surfaces defining a housing interior;

a first central coax conductor;

a second central coax conductor;

support means for supporting said first and second central coax conductors within said interior;

said housing having a forward wall with at least a first port extending therethrough and of a predetermined size to receive a jack plug, said first central coax conductors positioned to connect with a central conductor of said jack plug, respectively;

a first electrically conductive normal spring contact disposed within said housing and biased into electrical contact with said first central coax conductor;

a second electrically conductive contact disposed within said housing and in electrical contact with said second central coax conductor;

first urging means for urging said first normal spring contact away from said first central coax conductor in response to insertion of a jack plug into said first port;

a cross-conductor electrically connecting said first and second contacts;

said internal surfaces at least partially surrounding said first and second central coax conductors, with said surfaces having predetermined dimensions which provide for said jack module to have a desired impedance upon electrical connection of said electrically conductive surfaces to an electrical ground; and said housing having external, narrowly spaced apart sidewalls.

37. A coax jack module according to claim 36 further comprising a circuit including said cross-conductor, said first and second contacts, and said first and second central coax conductors, said circuit having to a desired impedance.

38. A coax jack module according to either of claims 30, 22, 31, 36, 32 or 33 further comprising a second port extending through said forward wall and of a predetermined size and position for said central conductor of said jack plug to connect with said second central coax conductor;

said second contact is a second normal spring contact biased into electrical contact with said second central coax conductor;

second urging means for urging said second normal spring contact away from said second central coax conductor in response to insertion of a jack plug into said second port.

* * * * *

UNITED STATES PATENT AND TRADEMARK OFFICE
CERTIFICATE OF CORRECTION

PATENT NO. : 5,467,062

DATED : Nov. 14, 1995

INVENTOR(S) : Burroughs

It is certified that error appears in the above-identified patent and that said Letters Patent is hereby corrected as shown below:

In column 1, line 20, delete "coax" after the letters "DSX-3"; line 21, insert --(hereinafter "coax")-- after the word "coaxial".

In column 4, line 44, "show" should read --shown--; line 56, "wall 18,16" should read --walls 16,18--; line 62, "28,26" should read --26,28--.

In column 6, line 36, insert --a-- after the word "is".

In column 7, line 58, "56 and 54" should read --54 and 56--.

In column 8, line 40, "cross bars" should read --cross beams--; line 62, "56,54" should read --54,56--.

In column 9, line 29, "urged" should read --urge--; line 61 delete "a" after the word "within".

In column 11, line 7, "53,52" should read --52,53--; line 16, "conductor" should read --conductors--; line 17, "conductor" should read --conductors--.

In column 13, line 4, "28,26" should read --26,28--.

UNITED STATES PATENT AND TRADEMARK OFFICE
CERTIFICATE OF CORRECTION

PATENT NO. : 5,467,062

DATED : Nov. 14, 1995

INVENTOR(S) : Burroughs

It is certified that error appears in the above-identified patent and that said Letters Patent is hereby corrected as shown below:

In column 14, line 11, insert --I-- after the word "current".

In column 15, line 44, insert --p=D/d-- after the word "where:".

In column 16, line 40, "The foregoing" should start a new paragraph.

In column 20, claim 16, line 9, insert --contact-- after the word "electrical".

In column 26, claim 37, line 13, delete "to" after the word "having".

Signed and Sealed this

Twenty-fifth Day of November, 1997

Attest:

BRUCE LEHMAN

Attesting Officer

Commissioner of Patents and Trademarks